US006935945B2

(12) United States Patent
Orak

(10) Patent No.: US 6,935,945 B2
(45) Date of Patent: Aug. 30, 2005

(54) INTERNET GAME SHOW IN WHICH VISUAL CLUE IS PROGRESSIVELY EXPOSED TO CONTESTANTS

(76) Inventor: Zeki Orak, 40 Parkridge Dr., Ste. 9, San Francisco, CA (US) 94131

( * ) Notice: Subject to any disclaimer, the term of this patent is extended or adjusted under 35 U.S.C. 154(b) by 45 days.

(21) Appl. No.: 09/850,955

(22) Filed: May 7, 2001

(65) Prior Publication Data

US 2002/0016196 A1 Feb. 7, 2002

Related U.S. Application Data

(60) Provisional application No. 60/204,399, filed on May 16, 2000.

(51) Int. Cl.[7] .................................................. A63F 13/00
(52) U.S. Cl. ............................................. 463/9; 463/42
(58) Field of Search ............................. 463/1, 9, 40–42

(56) References Cited

U.S. PATENT DOCUMENTS

| | | | | |
|---|---|---|---|---|
| 5,465,982 A | * | 11/1995 | Rebane .................... | 273/153 R |
| 5,695,400 A | * | 12/1997 | Fennell et al. ................. | 463/42 |
| 6,015,348 A | | 1/2000 | Lambright et al. | |
| 6,102,796 A | * | 8/2000 | Pajitnov et al. ................. | 463/9 |
| 6,179,713 B1 | * | 1/2001 | James et al. ................... | 463/42 |
| 6,267,379 B1 | * | 7/2001 | Forrest et al. .............. | 273/431 |
| 6,340,159 B1 | * | 1/2002 | Giangrante ................. | 273/272 |
| 6,360,831 B1 | * | 3/2002 | .ANG.kesson et al. ..... | 175/269 |
| 6,386,543 B1 | * | 5/2002 | Luker ......................... | 273/272 |

OTHER PUBLICATIONS

Marketing in the Era of Convergence. Publication [online]. Clickz.com, 1999 [retrieved on Sep. 2, 2002]. Retrieved from the Internet: <URL:www.clickz.com/tech/lead_edge/print.php/835911>.*

Salter Street Interactive. Publication [online]. Mtt, 1997 [retrieved on Sep. 2, 2002]. Retrieved from the Internet <URL:www.mtt.ca/cgi-bin/AED/AED.cgi?SUBMIT+DISPLAY&KEY=31640625&TABLE=Ne>.*

* cited by examiner

Primary Examiner—John M. Hotaling, II
Assistant Examiner—Aaron L. Enatsky
(74) Attorney, Agent, or Firm—Townsend and Townsend and Crew LLP

(57) ABSTRACT

An internet game show host program running on a server computer retrieves a visual clue that is associated with a correct textual answer. Each contestant interactively selects the portions of the visual clue to be exposed. The entire visual clue is loaded onto each of the contestants' computers prior to the beginning of each game, and the contestants' game software progressively exposes the visual clue. Contestants fill in a series of blanks with the answer and activate a send button. The contestants' game software sends the contestant's answer along with a time stamp indicating the time elapsed since the beginning of the internet game show. At the end of the internet game show, the game show host computer compares the times that the correct responses were sent. The correct response that contains the earliest send time is the winning response.

24 Claims, 16 Drawing Sheets

| TIME | IDENTIFIER |
|---|---|
| 20.08 | PLAYER_9 |
| 19.66 | PLAYER_1 |
| 17.76 | PLAYER_6 |
| 18.69 | PLAYER_4 |
| 22.36 | PLAYER_7 |
| 31.00 | PLAYER_2 |

1500

INTERNET GAME SHOW IN WHICH VISUAL CLUE IS PROGRESSIVELY EXPOSED TO CONTESTANTS

CROSS-REFERENCES TO RELATED APPLICATIONS

This application claims priority from U.S. Provisional Application No. 60/204,399 entitled "Puzzoo Internet Game Show," filed May 16, 2000, which is herein incorporated by reference in its entirety for all purposes.

BACKGROUND OF THE INVENTION

1. Field of the Invention

The present invention is related to the field of internet usage; and specifically, to the field of multi-player internet games.

2. Discussion of the Related Art

Several conventional multi-player games, such as board games, are known in the art. Furthermore, communications over the internet is known in the art. A need exists for multi-player games implemented over the internet.

BRIEF SUMMARY OF THE INVENTION

According to the present invention, an internet game show is played on the internet in real-time by anyone who has access to the internet. An internet game show host program running on a server computer retrieves a visual clue that is associated with a correct textual answer. Each player from amongst a plurality of players (contestants) establishes a connection to the game show host server computer through the internet. In the presently preferred embodiment, before any games are played, the host computer sends to each of the players game software that specifies the screen appearance of a game window in which the contestants' game is displayed to the player. At the beginning of the game, each contestant's game window includes a series of blanks corresponding to the words of the correct textual answer. During the game, the visual clue is progressively, in other words, incrementally, exposed to each of the contestants. In the some embodiments of the present invention, the visual clue is progressively exposed to the contestants in an identical manner in real time. Thus, each successive portion of the visual clue is exposed to all of the contestants at the same real time. In other embodiments according to the present invention, each contestant interactively determines which portions of the visual clue to which he is exposed during the real time progression of the internet game show; in these embodiments, the various contestants are not exposed to the same portion of the visual clue at the same real time.

The objective of the game for each of the contestants is to solve the puzzle by returning a response to the game show host that contains the correct textual answer corresponding to the visual clue. The winning response received by the game show host is the earliest dispatched response that contains the correct textual answer. The winning contestant who returns the winning response may receive a prize that may be identified in the game window.

In some embodiments according to the present invention, including those embodiments in which each contestant interactively determines which portions of the visual clue he is exposed to during the course of the game, the entire visual clue is loaded onto each of the contestants' computers prior to the beginning of each game. However, in these embodiments, the contestants' game software is written such that the visual clue is progressively exposed according to the present invention. In this manner, each contestant is seeing the exact same portions of the visual clue at the same real time in some embodiments. In the other embodiments in which user interactivity determines the portions of the visual clue that are exposed, no more than a predetermined maximum amount of the visual clue is visible to each contestant at the same real time. In these embodiments, the progressive exposing of the visual clue during the play of the internet game show is accomplished even though there is no additional information being passed from the game show host computer to the contestants' computer during the play of the game.

In other embodiments according to the present invention in which every contestant is simultaneously exposed to the same portions of the visual clue, each of the progressive portions of the visual clue are sent to each of the contestants simultaneously during the play of the game through the internet as streams from the internet game show host.

In all embodiments according to the present invention, whenever the contestant believes that he knows the correct answer, he fills in the series of blanks with the characters of his answer and activate a send button indicating that his answer should be sent to the game show host computer. When the contestant activates a send button indicating that his answer should be sent to the game show host, the contestant's game software sends the contestant's answer along with a time stamp indicating the real time elapsed since the beginning of the internet game show that the answer was sent by the contestant's computer.

According to another aspect of the present invention, when the internet game show host receives a response from a contestant, the internet game show host compares the contestant's answer to the correct answer. If the contestant's answer does not match the correct answer, then the game show host computer sends back to the contestant a message indicating that the contestant's answer is incorrect. In this case, the contestant's game software reports to the contestant that answer that the contestant had entered is incorrect, clears the incorrect answer from the series of blanks, and suggests to the contestant that he try again. If the contestant's answer matches the correct answer, then the game show host computer sends back to the contestant a message indicating that the contestant's answer is correct. In this case, the contestant's game software reports to the contestant that the answer that the contestant had entered is correct and leaves the correct answer in the series of blanks. In the embodiments in which the contestant has no control over which portions of the visual clue are exposed, the visual clue continues to be progressively exposed to the contestant until the entire visual clue has been revealed. After the puzzle has been entirely revealed, the game show host sends a message to each contestant indicating the winner of the game.

At the end of the internet game show, for each contestant that sends a response to the game show host that contains the correct answer, the game show host computer compares the times that the responses were sent. The response containing the correct answer that contains the earliest send time is the winning response, and the contestant that sent this answer is the winner of the game. Because the game show host cannot control the total real time delay in transit from the contestant's computer to the game show host's computer through the internet, the game show host waits for some predetermined time after the puzzle has been entirely revealed before comparing the send times of all the responses containing the correct answer. This predetermined wait time helps to ensure that all responses that contain the correct answer are in fact received by the game show host's computer before the winner is determined.

In contrast, in the embodiments in which the contestant has control over which portions of the visual clue are exposed, such as through the use of the cursor controlled by a mouse, then the entire visual clue is revealed to the contestant after the contestant's game software receives a message from the game show host indicating that the contestant's answer was correct. In one alternative according to these embodiments, at some predetermined time after the game show host first receives a response from any contestant that contains the correct answer, then the contestant's game software reveals the entire visual clue to the user along with an indication of the winner. In another alternative according to these embodiments, at a predetermined time after the beginning of the game, the entire visual clue is revealed to the contestant along with an indication of the winner, regardless of the time at which the first response containing a correct answer was received by the game show host.

These and other features and advantages of the present invention are more fully discussed in the Detailed Description of the Invention, which discussed the Figures in narrative form.

The Figures are more fully explained in narrative form in the Detailed Description of the Invention.

DETAILED DESCRIPTION OF THE INVENTION

Figure 1:
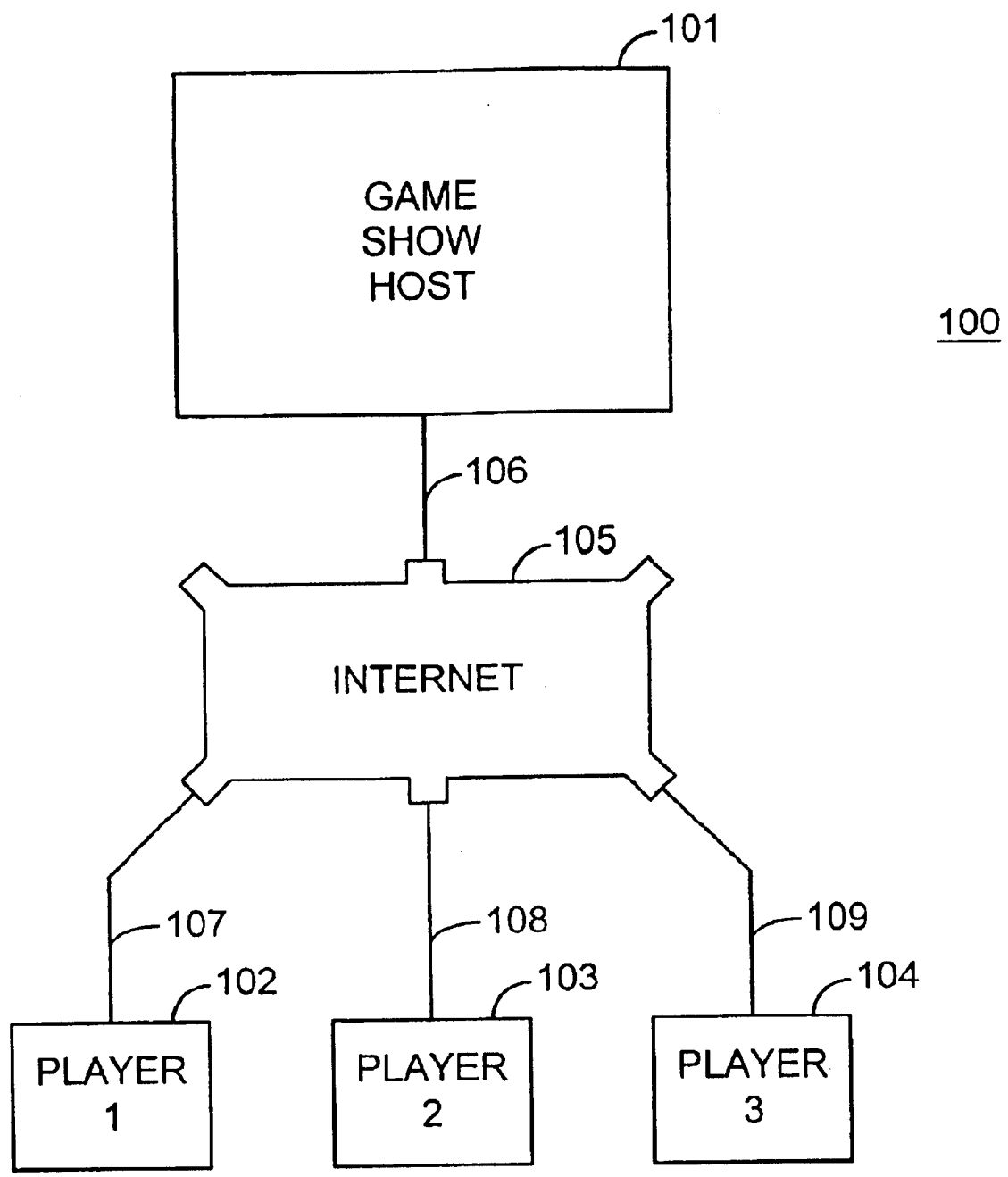
FIG. 1 illustrates a system for playing an internet game show according to the present invention.

FIG. 1 illustrates a system 100 for playing an internet game show according to the present invention. The game show host 101 is connected to the internet 105 through communication link 106. Player 1 102 is connected to the internet 105 through communication link 107. Player 2 103 is connected to the internet 105 through communication link 108. Player 3 104 is connected to the internet 105 through communication link 109. The game show host 101 administers the internet game show according to the present amongst a plurality of contestants, such as Player 1 102, Player 2 103, and Player 3 104. Although the system 100 shown in FIG. 1 includes only three players, there is no strict requirement as to the number of players according to the present invention. For example, a single player may play alone, or an arbitrarily large number of players may participate in the same internet game show according to the present invention. The various communication links 106 through 109 to the internet 105 for the game show host 101 and the various contestants 102 through 104 may be implemented in any of a variety of connection methods, such cable connections demodulated by a cable modem, local area networks that are connected to the internet through a firewall, wireless connections, dial-up connections through the telephone lines to an internet service provider, or other connection facilities.

Figure 2:
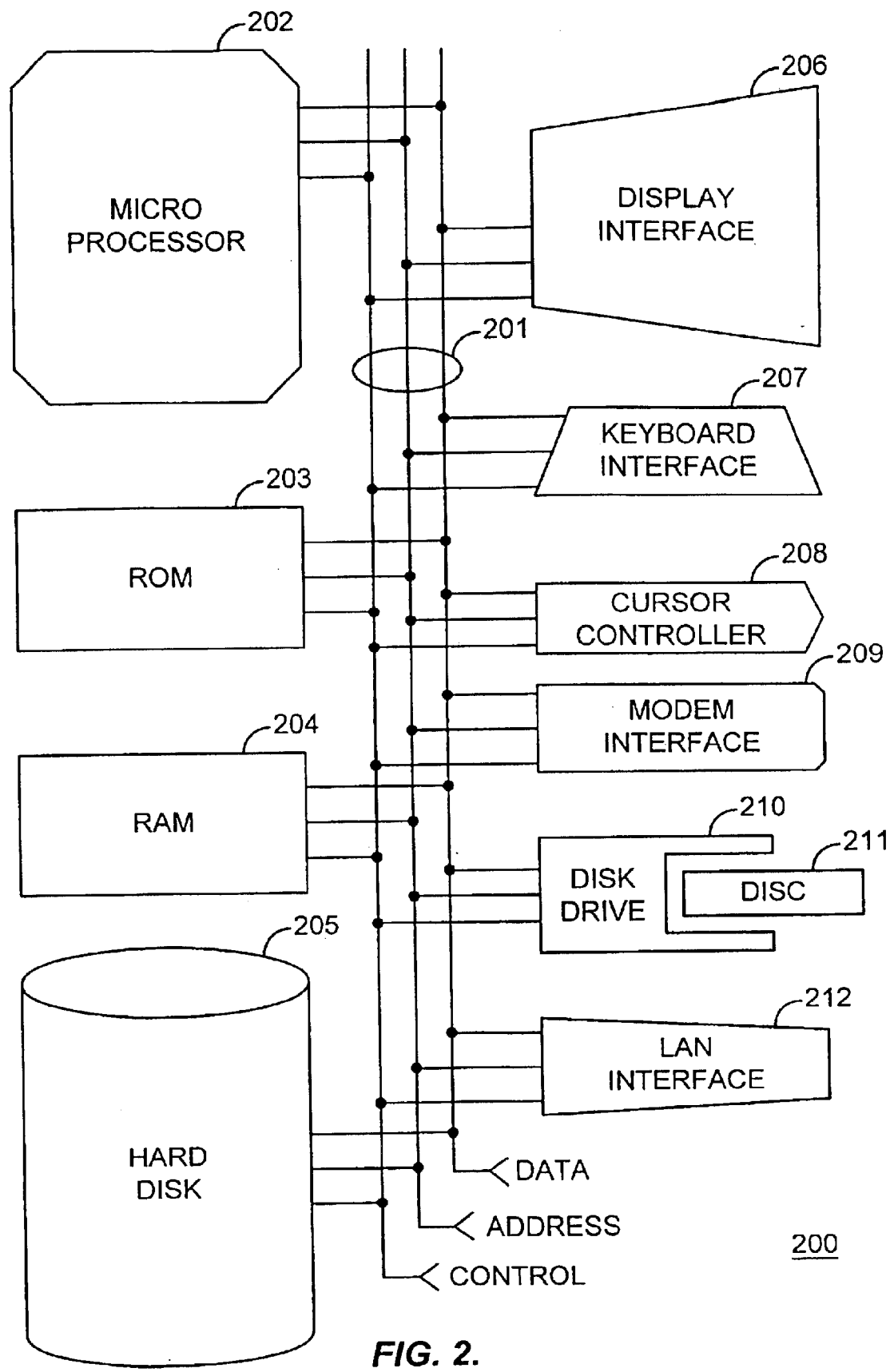
FIG. 2 illustrates a general purpose computer suitable for implementing the game show host computer as well as the various contestants' computers during an internet game show according to the present invention.

FIG. 2 illustrates a general purpose computer architecture 200 suitable for implementing the game show host's computer 101 as well as the various contestants' computers 102 through 104 during an internet game show according to the present invention. A microprocessor 202 communicates with random access memory 204 over a data bus 201. The general purpose computer architecture 200 optionally includes read only memory 203, which provides non-writable, non-volatile storage, and hard disk 205, which provides large amounts of rewritable storage space. The general purpose computer architecture 200 includes a display interface 206 for presenting images to the human contestant during the play of an internet game show according to the present invention. The human player submits contestant input through keyboard interface 207 and/or cursor controller 208, such as a mouse or touchpad. The general purpose computer architecture 200 also includes one or more devices for connection to the internet, such as modem interface 209 and local area network interface 212. The general purpose computer architecture 200 may include devices for accepting computer readable storage media, such as disk drive 210, which accepts either a compact disk or floppy disk 211.

In the presently preferred embodiments, the downstream communications from the game show host to the various contestants and the upstream communications from the various contestants to the game show are performed through the internet. However, there is no requirement according to the present invention that communications is performed over the internet. For example, the game show according to the present invention can also be performed "live" in a studio, in which downstream communication is accomplished by each contestant viewing the same visual display screen projected on a wall or screen; and in which upstream communication is performed orally or through a local area network at the studio. As another example, downstream communications can be performed on television over the public airways or in a private cable system, with the various contestants watching the clue being incrementally exposed on their individual television screens at home, while upstream communications from the contestants to the game show host is performed orally through the telephone, by computer through the internet or via dial-up networking directly to the game show host.

Figure 3A:
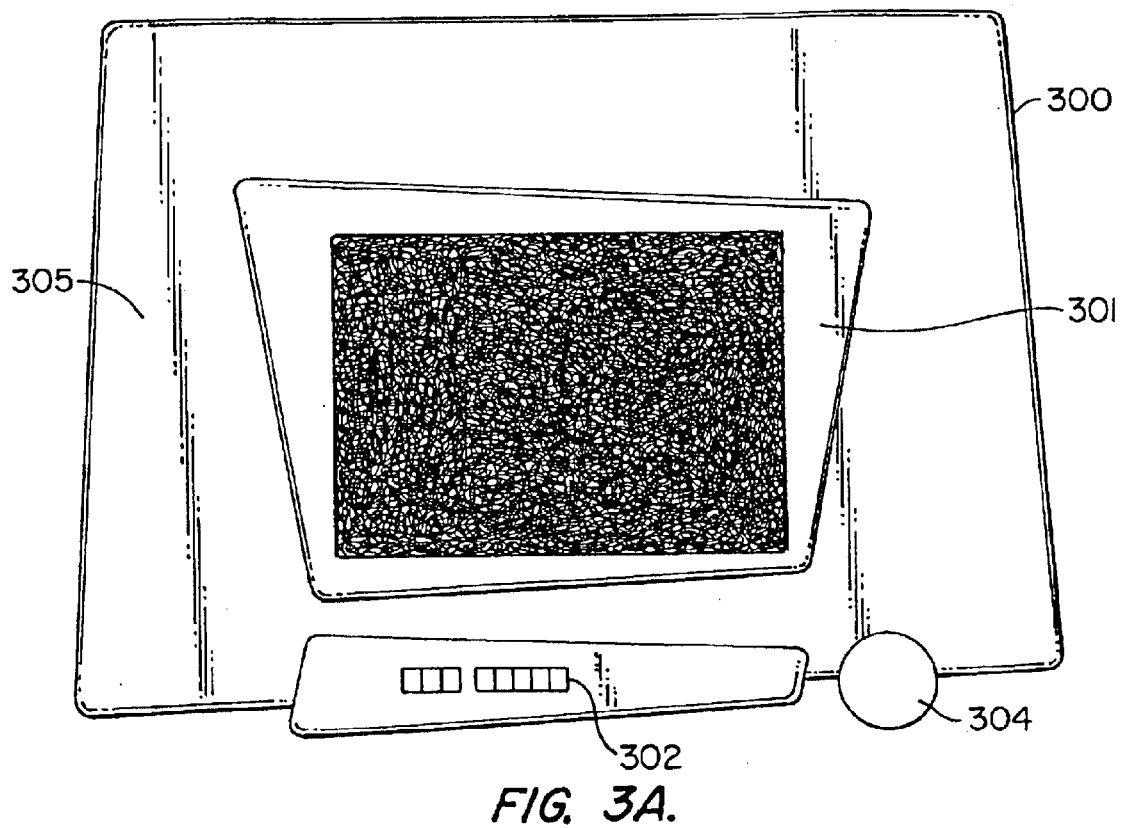
FIG. 3A illustrates a screen appearance for a contestant at a beginning of an internet game show in which the visual clue is progressively, in other words, incrementally, exposed according to the present invention.

FIG. 3A illustrates a screen appearance for a contestant at a beginning of an internet game show in which the clue is progressively, in other words, incrementally, exposed according to the present invention. The internet game show is played in a game window 300 displayed on each contestant's display 206. Before the internet game show begins, a portion of the game window 301 is completely blank, but will be progressively exposed during the play of the internet game show. The blank rectangular portion 301 of the game window 300 will be used during the internet game show to expose to the contestant portions of the visual clue that has been associated by the game show host 101 to a correct textual answer. The game window 300 further includes a series of blank character spaces 302 corresponding to the characters of the correct textual answer. A send button 304 is provided for instructing the contestant's internet game show software to send a response to the internet game show host 101. Before the beginning of the game, the visual clue is completely hidden from the user. The game window 300 may optionally also include an identification of a prize 305, which may be awarded to the contestant determined by the internet game show host to be the winner. The game window 300 further includes a visual field 306 in which the winner's name or other unique identifier can be displayed at the conclusion of the game. Although the series of blank character spaces 302 corresponding to the characters in the correct answer have been illustrated as showing the exact number of words, letters, and spaces in the correct answer, this is illustrated by way of example only, not by way of limitation. For example, there is no requirement that the series of blank character spaces 302 be provided at all; in other words; alternatively, the contestant may be required to enter a textual answer in using a text editor in a separate window and to transmit the answer to the host, and in this case, there is no guidance to the contestants as to the length of the correct answer. In this alternative, the contestants may submit answers of any arbitrary length and phrasing.

Figure 3B:
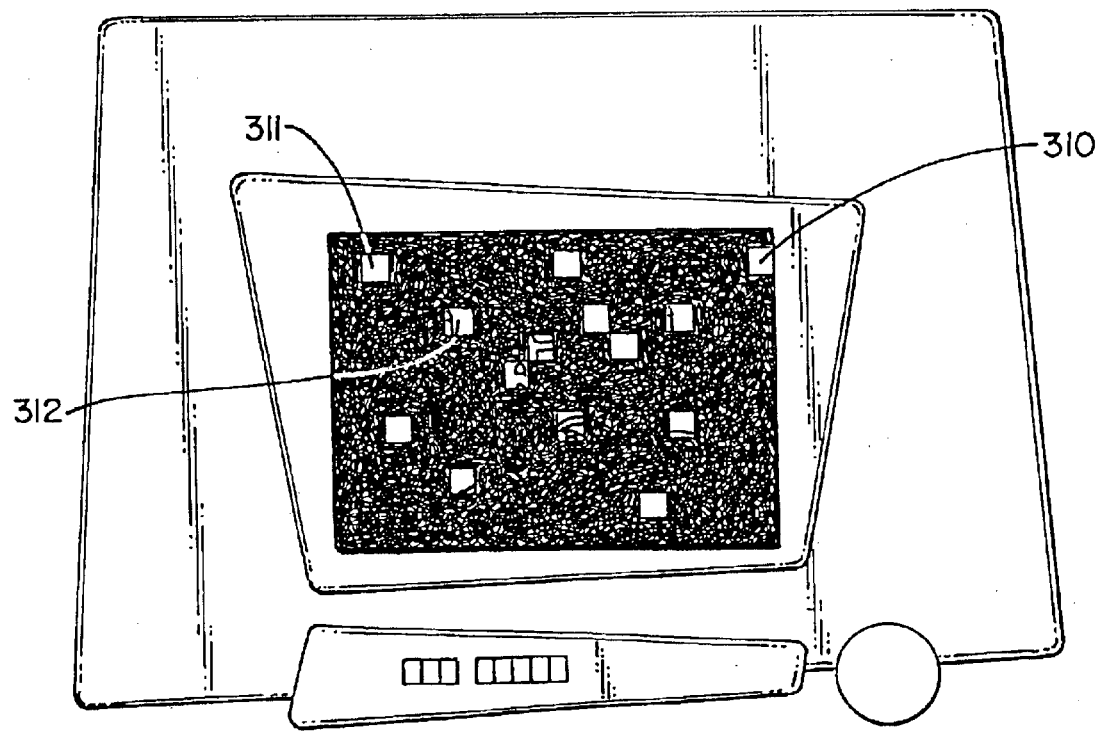
FIG. 3B illustrates a screen appearance for a contestant at an intermediate stage of an internet game show in which square portions of the visual clue are progressively exposed according to the present invention.
Figure 3C:
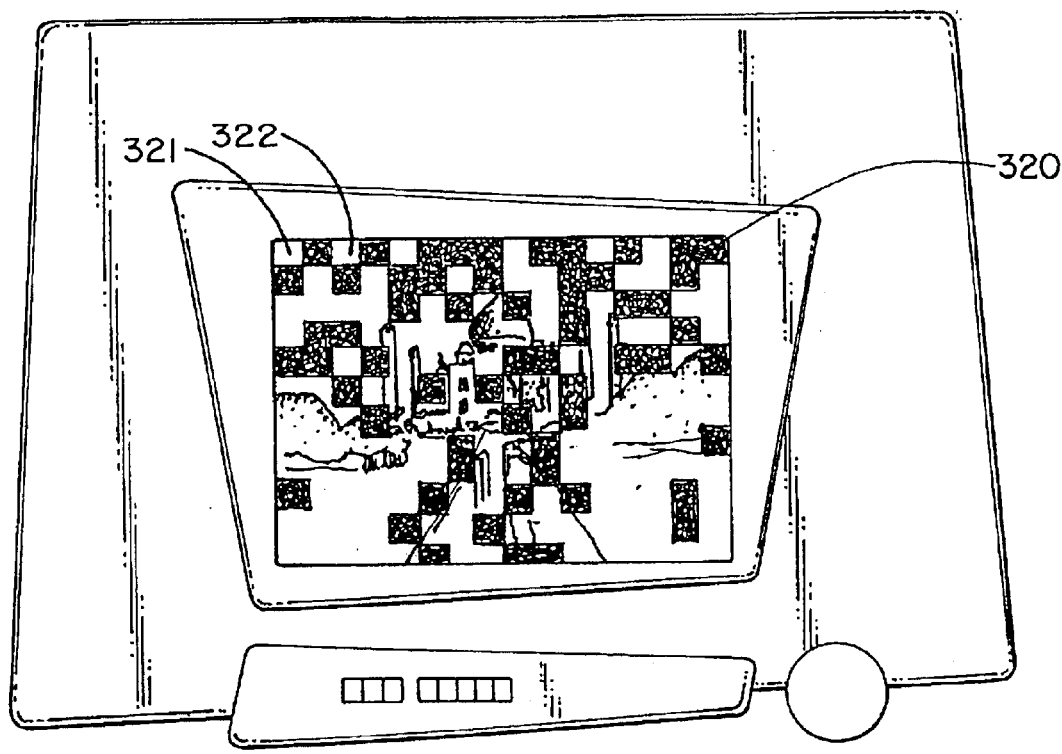
FIG. 3C illustrates a screen appearance for a contestant at a further intermediate stage of an internet game show in which square portions of the visual clue are progressively exposed according to the present invention.

According to the present invention, the visual clue is progressively exposed to the contestant in any one of a variety of methods. For example, FIG. 3B illustrates a screen appearance 310 for the contestants at an intermediate stage of an internet game show in which square portions of the visual clue are progressively exposed according to the present invention. In this embodiment, the rectangular visual clue is separated into a Cartesian array of squares. At predetermined real time intervals, the various squares of the visual clue are exposed to each of the contestants. For example, at the intermediate time shown in FIG. 3B, the squares 311 and 312 have been exposed to each of the contestants simultaneously. FIG. 3C illustrates a screen appearance 320 for a contestant at a further intermediate stage of an internet game show in which square portions of the clue are progressively exposed according to the present invention. For example, additional square portions 321 and 322 have been exposed to each of the contestants at this later intermediate stage of the internet game show. In the embodiments illustrated in FIGS. 3A, 3B, and 3C, the square portions are randomly chosen, and once any given square is exposed to the contestants, it remains on the screen for the remaining duration of the internet game show. However, there is no requirement according to the present invention that the square portions are randomly chosen. Thus, the square portions to be progressively exposed may alternatively be exposed in a predetermined geometric pattern. During each predetermined time period, one or more of the square portions are exposed to the user. In the presently preferred embodiment, the predetermined time period is constant; however, there is no requirement according to the present invention that the time period between successive uncoverings of the square is constant. Furthermore, one or more or a variable number of squares may alternatively be exposed during each of the predetermined time periods. Regardless of the manner in which the square portion are exposed, in these embodiments all contestants, such as Player 1 102, Player 2 103, and Player 3 104 view the same screen appearances 301, 310, and 320 at the same real time during the play of the internet game show according to the present invention.

Figure 4A:
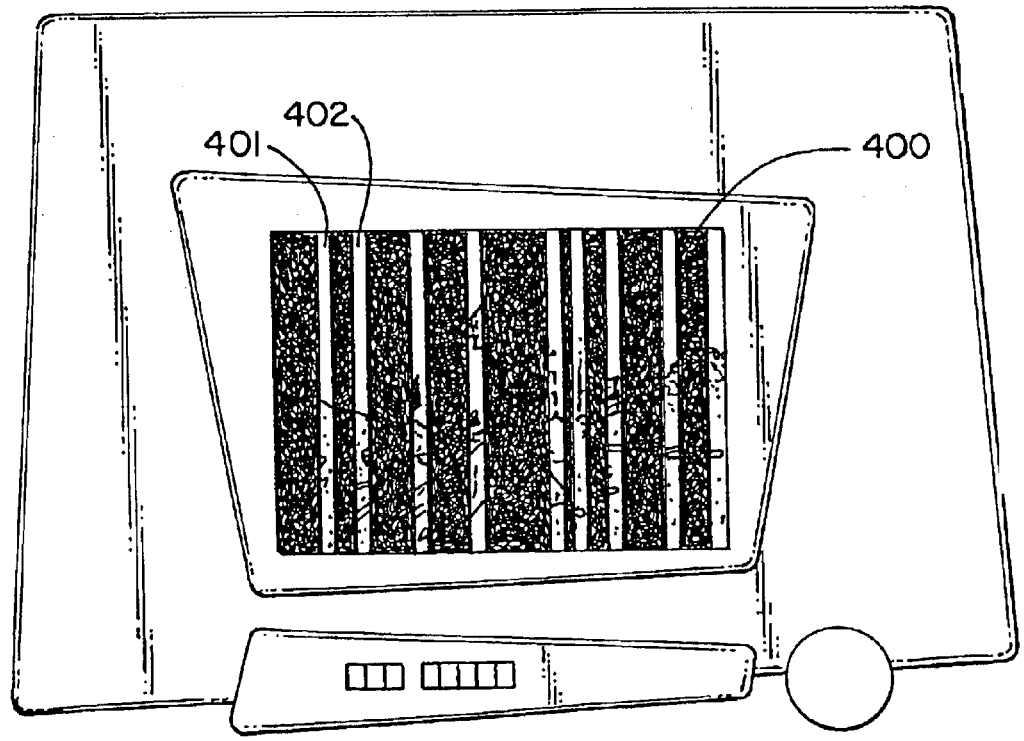
FIG. 4A illustrates a screen appearance for a contestant at an intermediate stage of an internet game show in which vertical strips of the visual clue are progressively exposed according to the present invention.
Figure 4B:
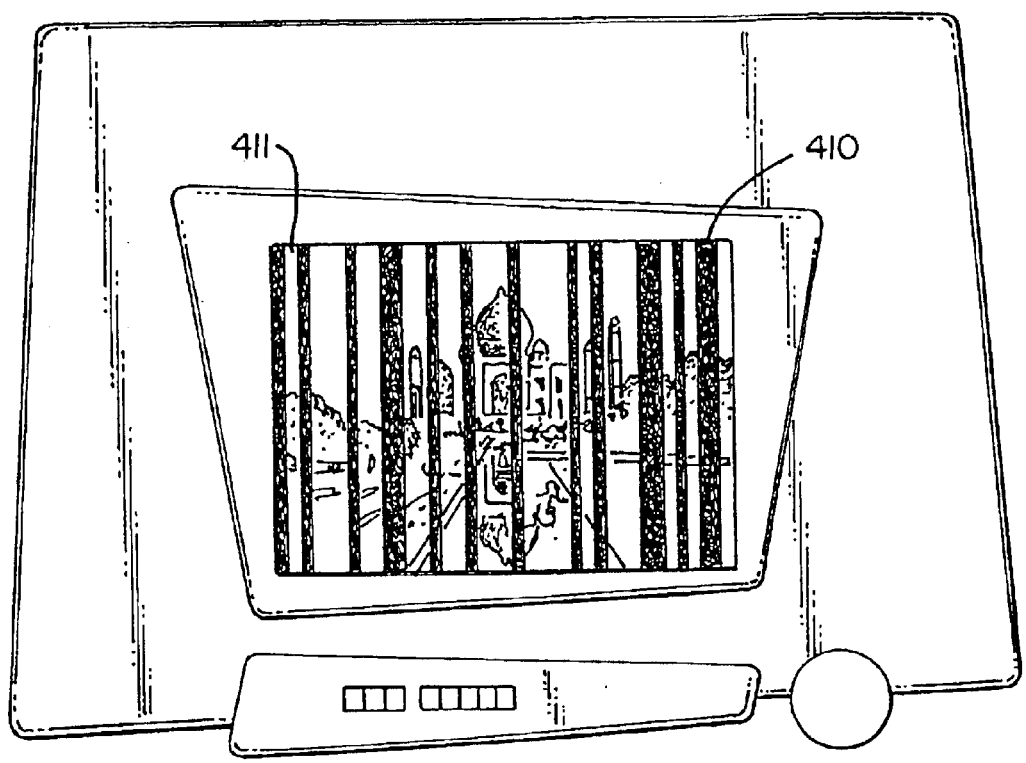
FIG. 4B illustrates a screen appearance for a contestant at a further intermediate stage of an internet games show in which vertical strips of the visual clue are progressively exposed according to the present invention.

FIG. 4A illustrates an alternative screen appearance 400 for the contestants at an intermediate stage of an internet game show in which vertical strips of the visual clue are progressively exposed according to the present invention. In all of the alternative embodiments in which portions of the clue are progressively exposed to the contestants, the beginning screen appearance 300 is preferably blank, as illustrated in FIG. 3A. However, there is no requirement according to the present invention that the beginning screen appearance is blank. For example, at the beginning of each game, each contestant's screen may alternatively include a predetermined portion of the visual clue, which is then further exposed as the game progresses. In the example shown in FIG. 4A, vertical strip portions 401 and 402 have been exposed to each of the contestants through their displays 206. FIG. 4B illustrates the screen appearance 410 for a contestant at a further intermediate stage of an internet games show in which vertical strips of the clue are progressively exposed according to the present invention. For example, vertical strip 411 has been exposed to each of the contestants at the intermediate stage illustrated in FIG. 4B.

Figure 5A:
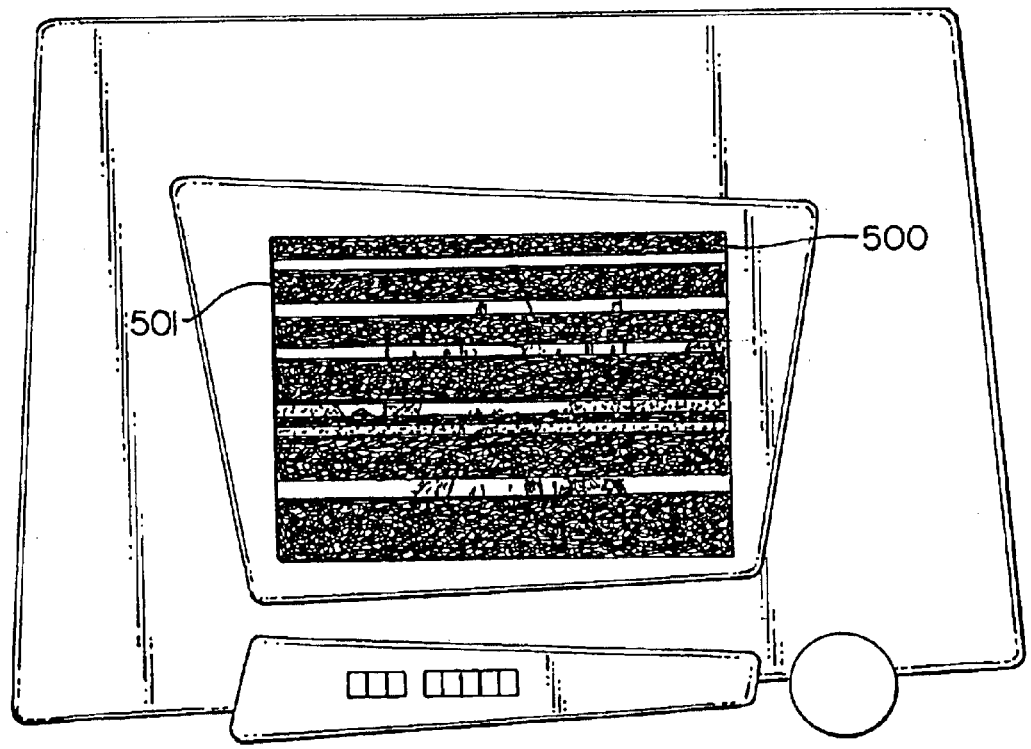
FIG. 5A illustrates a screen appearance for a contestant at an intermediate stage of an internet game show in which horizontal strips of the visual clue are progressively exposed according to the present invention.

FIG. 5A illustrates yet another alternative screen appearance 500 for the contestants at an intermediate stage of an internet game show in which horizontal strips of the visual clue are progressively exposed according to the present invention. As discussed above with reference to FIG. 4B, the preferred beginning screen appearance is the blank screen 301 illustrated in FIG. 3B, although there is no requirement according to the present invention that the contestants' screens are blank at the beginning of the internet game show. At the intermediate stage of the internet game show shown in FIG. 5A, horizontal strip 501 of the visual clue has been exposed to all of the contestants.

Figure 5B:
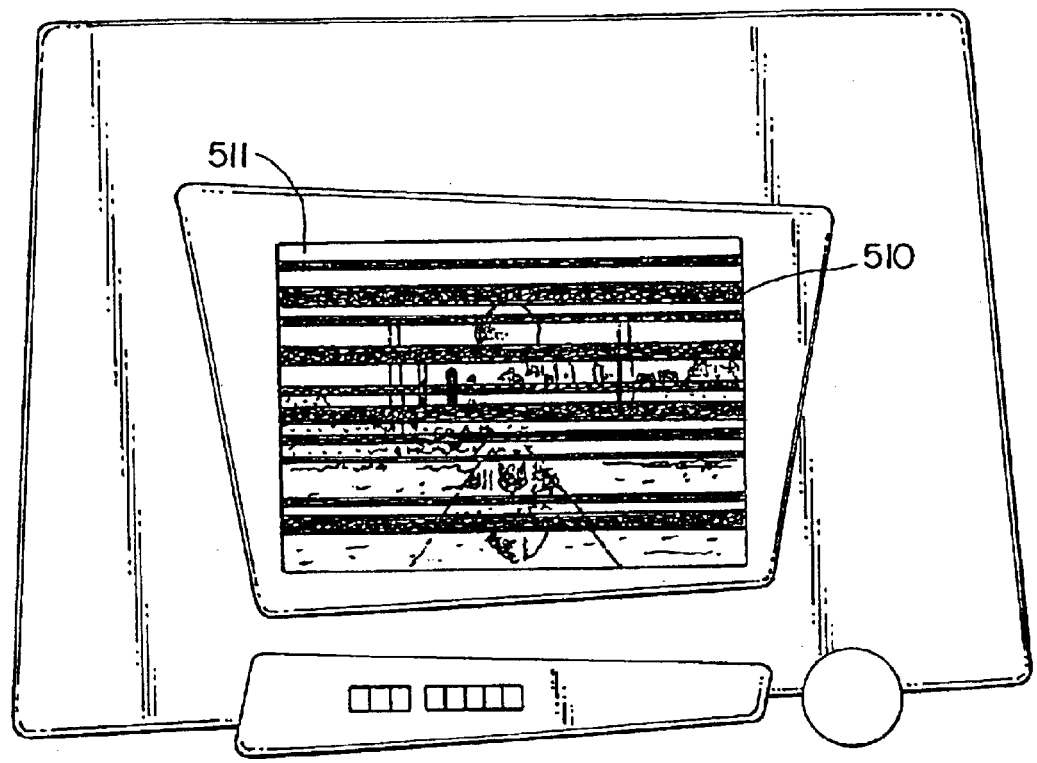
FIG. 5B illustrates a screen appearance for a contestant at a further intermediate stage of an internet game show in which horizontal strips of the visual clue are progressively exposed according to the present invention.

FIG. 5B illustrates a screen appearance 510 for the contestants at a further intermediate stage of an internet game show in which horizontal strips of the visual clue are progressively exposed according to the present invention. At the stage illustrated in FIG. 5B, the horizontal strip 511 has been exposed to the contestants. In the alternative embodiments illustrated in FIGS. 4A, 4B, 5A, and 5B, there is no requirement according to the present invention that each of the strips to be exposed are of a fixed width.

Thus far, FIGS. 3A through 5B have described various presently preferred embodiments of the present invention in which portions of the visual clue are progressively exposed to the user. It is to be understood that those embodiments are offered by way of example, not by way of limitation. For example, the visual clue can be exposed in windows of any arbitrary shape and in any organization without departing from the spirit and scope of the present invention. The present invention includes progressively exposing the visual clue in any manner.

Figure 6A:
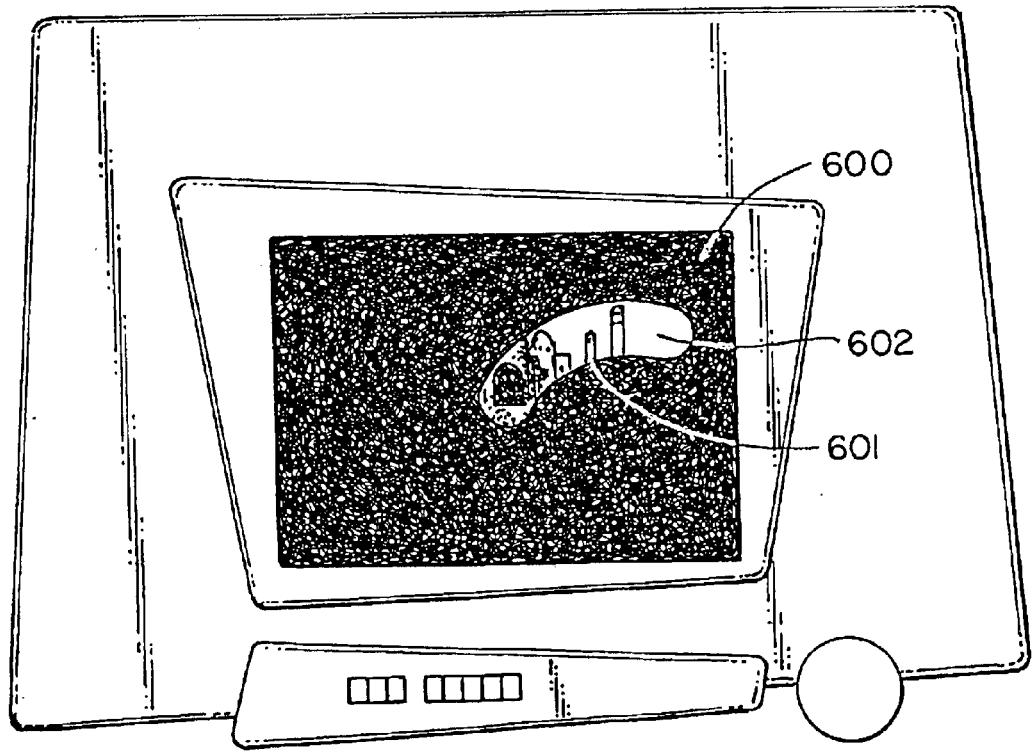
FIG. 6A illustrates a screen appearance for a contestant at an intermediate stage shortly after the beginning of an internet game show in which adjacent portions of the visual clue are progressively exposed in a snake-like organic motion according to the present invention.

FIG. 6A illustrates a screen appearance 600 for a contestant at an intermediate stage shortly after the beginning of an internet game show in which adjacent portions of the visual clue are progressively exposed in a snake-like organic motion according to the present invention. As in the previous embodiments, the beginning screen appearance is preferably a blank screen 300, as illustrated in FIG. 3A, although there is no requirement that the initial screen is blank. At the stage shown in FIG. 6A, snake-like portion 601 has been exposed to each of the contestants in an internet game show according to the present invention. In the preferred embodiment of the present invention, one end 602 of the snake-like portion, analogous to the snake's head, expands into adjacent portions of the visual clue. However, there is no requirement according to the present invention that only one end expand into the previously unexposed portions of the visual clue. For example, both ends can alternatively expand into adjacent areas of the visual clue.

Figure 6B:
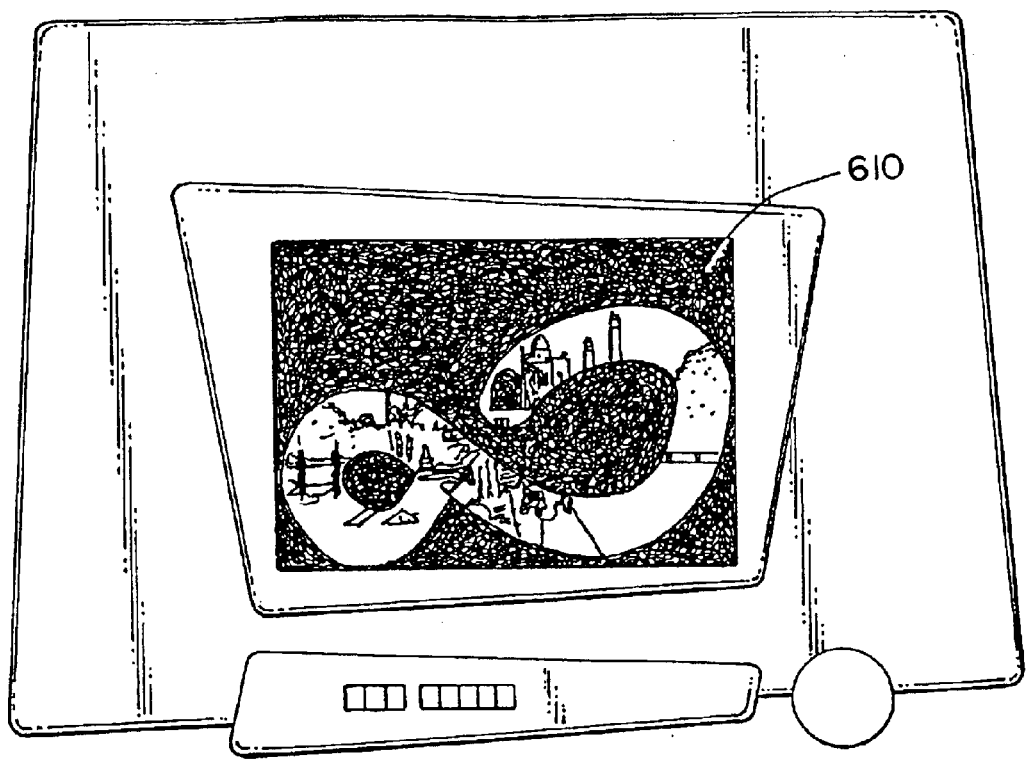
FIG. 6B illustrates a screen appearance for a contestant at a further intermediate stage of an internet game show in which adjacent portions of the visual clue are progressively exposed in a snake-like organic motion according to the present invention.

FIG. 6B illustrates a screen appearance 610 for a contestant at a further intermediate stage of an internet game show in which adjacent portions of the visual clue are progressively exposed in a snake-like organic motion according to the present invention. The portion 611 of the visual clue that has been exposed to the contestants the stage shown in FIG. 6B includes the portion 601 which was previously exposed in the internet game show (as illustrated by FIG. 6A) and additional adjacent portions of the visual clue, such that the adjacent portions are chosen in an extending snake-like organic motion. According to this embodiment, the snake-like exposing can be performed continuously in real-time, such that the screen image shown to each contestant appears to grow continuously during each instant of real time. Alternatively, the snake-like exposing is performed in discrete steps in predetermined fixed or variable real-time increments, as discussed above with respect to FIGS. 3B and 3C, such as once per second of real time.

Figure 6C:
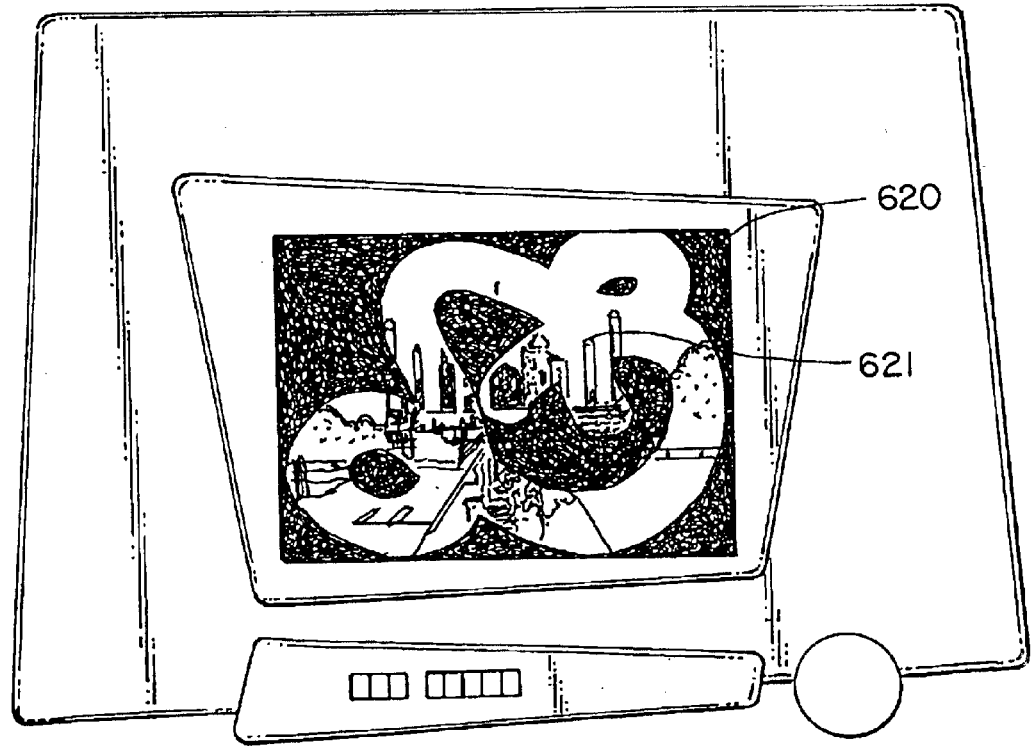
FIG. 6C illustrates a screen appearance for a contestant at yet a further intermediate stage of an internet game show in which adjacent portions of the visual clue are progressively exposed in a snake-like organic motion according to the present invention.

FIG. 6C illustrates a screen appearance 620 for a contestant at yet a further intermediate stage of an internet game show in which adjacent portions of the clue are progressively exposed in a snake-like organic motion according to the present invention. Whenever the snake-like organic motion crosses an already exposed portion of the visual clue, such as the region 621, then the already exposed portion remains exposed, and no additional portions of the visual clue are exposed to the contestants until the head of the snake reaches a portion of the visual clue that is not already exposed.

Figure 7A:
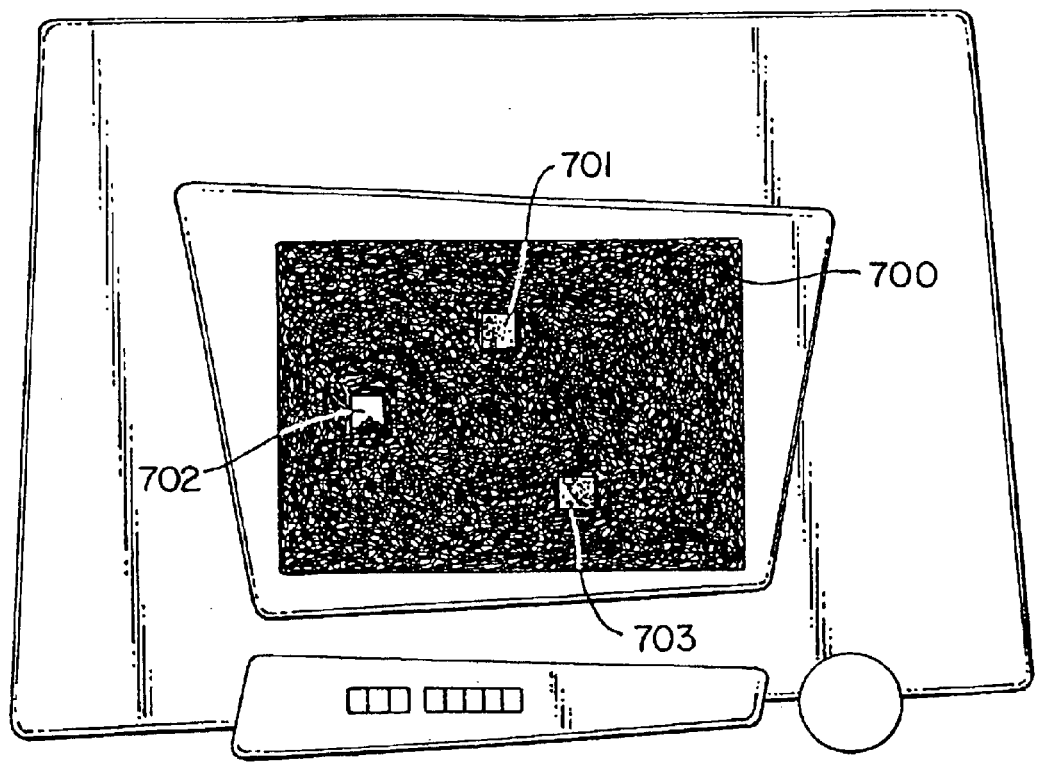
FIG. 7A illustrates a screen appearance for a contestant at an intermediate stage of an internet game show in which square portions of the visual clue are progressively exposed according to the present invention.

FIG. 7A illustrates a screen appearance 700 for a contestant at an intermediate stage of an internet game show in which square portions of the clue are progressively exposed according to the present invention. Preferably, the beginning screen is blank, such as shown by screen 301 in FIG. 3A, although there is no requirement that the beginning screen is blank according to the present invention. In the example shown in FIG. 7A, square portions 701, 702, and 703 have been exposed at this intermediate stage of an internet game show according to the present invention.

Figure 7B:
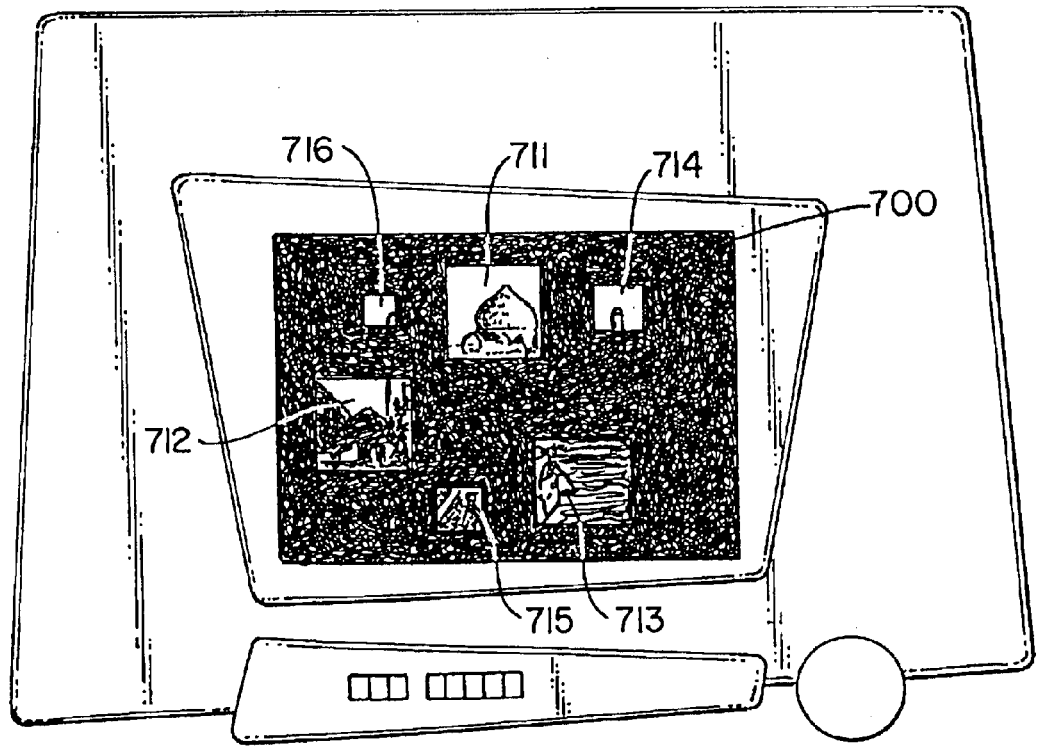
FIG. 7B illustrates a screen appearance for a contestant at yet a further stage of an internet game show in which square portions of the visual clue are progressively exposed and in which already exposed square portions grow in size so that adjacent portions to the already exposed square portions are exposed according to the present invention.

FIG. 7B illustrates a screen appearance 710 for a contestant at yet a further stage of an internet game show in which square portions of the visual clue are progressively exposed and in which already exposed square portions grow in size so that adjacent portions to the already exposed square portions are exposed according to the present invention. Thus, for example, the square portions 711, 712, and 713 of FIG. 7B include the portions 701, 702, and 703 of FIG. 7A, as well as surrounding adjacent areas which were exposed as the squares increase in size. In the example shown in FIG. 7B, additional square portions 714 and 715 were exposed and have expanded somewhat in the real time intervening the screen appearances 700 and 710. In addition, square portion 716 has been exposed in the time intervening the screen appearances 700 and 710, although square 716 is younger than square portions 711 through 715, as evidenced by its smaller size. As discussed above with respect to FIGS. 6A, 6B, and 6C, the expanding of the square portions can be continuous or in discrete steps. Moreover, the expanding of the square portions can be at a constant or variable rate, and can expand into any adjacent areas of the square portions according to the present invention.

Figure 8A:
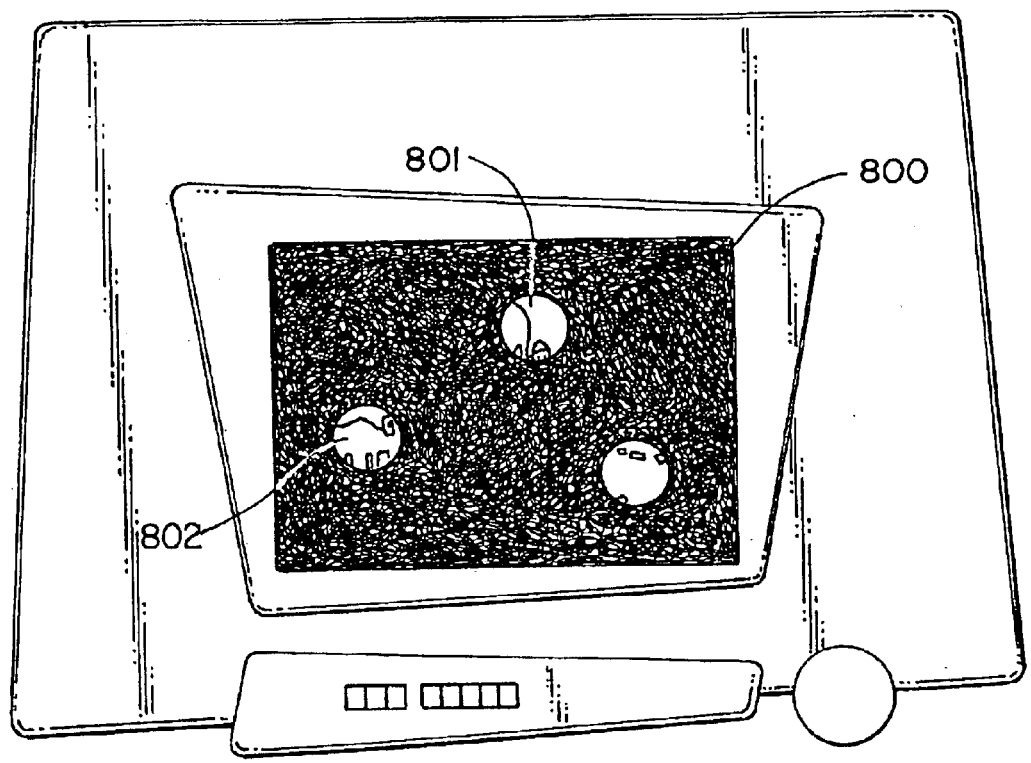
FIG. 8A illustrates a screen appearance for a contestant at an intermediate stage of an internet game show in which circular portions of the visual clue are progressively exposed according to the present invention.

FIG. 8A illustrates a screen appearance 800 for the contestants at an intermediate stage of an internet game show in which circular portions of the visual clue are progressively exposed according to the present invention. Preferably starting with a blank screen 300, shown in FIG. 3A, at some later real time in the internet game show circular portions 801 and 802 have been exposed.

Figure 8B:
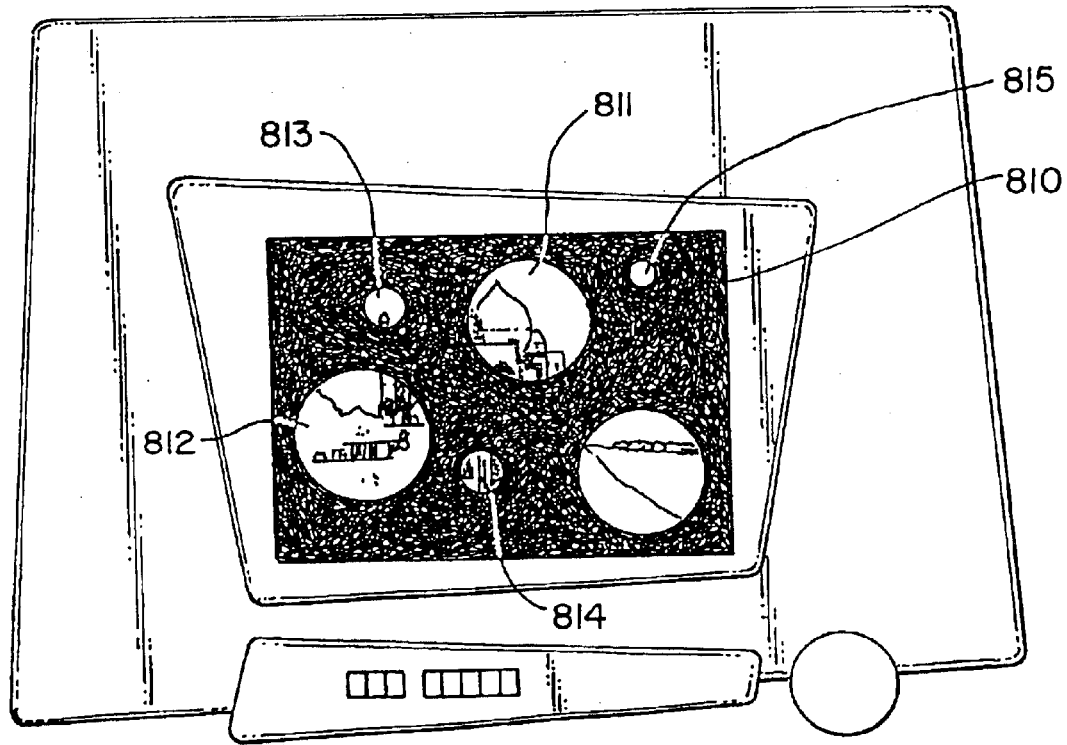
FIG. 8B illustrates a screen appearance for a contestant at yet a further stage of an internet game show in which circular portions of the visual clue are progressively exposed and in which already exposed circular portions grow in size so that adjacent portions to the already exposed circular portions are exposed according to the present invention.

FIG. 8B illustrates a screen appearance 810 for the contestants at yet a further stage of an internet game show in which circular portions of the clue are progressively exposed and in which already exposed circular portions grow in size so that adjacent portions to the already exposed circular portions are exposed according to the present invention. Thus, for example, the circular portions 811 and 812 of FIG. 8B include the portions 801 and 802 of FIG. 8A, as well as surrounding adjacent areas which were exposed as the circular portions increased in radius. In the example shown in FIG. 8B, additional circular portions 813 and 814 were exposed and have expanded somewhat in the real time intervening the screen appearances 800 and 810. In addition, circular portion 815 has been exposed in the time intervening the screen appearances 800 and 810, although circular portion 815 is younger than circular portions 811 through 814, as evidenced by its lesser radius. As discussed above with respect to FIGS. 6A, 6B, and 6C, the expanding of the circular portions can be continuous or in discrete steps. Moreover, the expanding of the circular portions can be at a constant or variable rate.

The above-described embodiments illustrated in FIGS. 6A through 8B described various embodiments of the present invention including methods of exposing the visual clue in which adjacent portions of the already exposed portions are further exposed to the contestants. It is to be understood that those embodiments are offered by way of example, not by way of limitation. For example, the present invention includes expanding exposed portions so as to make the exposed portions larger in any arbitrary fashion. For example, the horizontal or vertical strips can be made wider continuously or in discrete steps in real time in accordance with the present invention. Thus, the present invention includes all such embodiments in which the already exposed portions are expanded so as to expose adjacent portions to the contestants.

Figure 9:
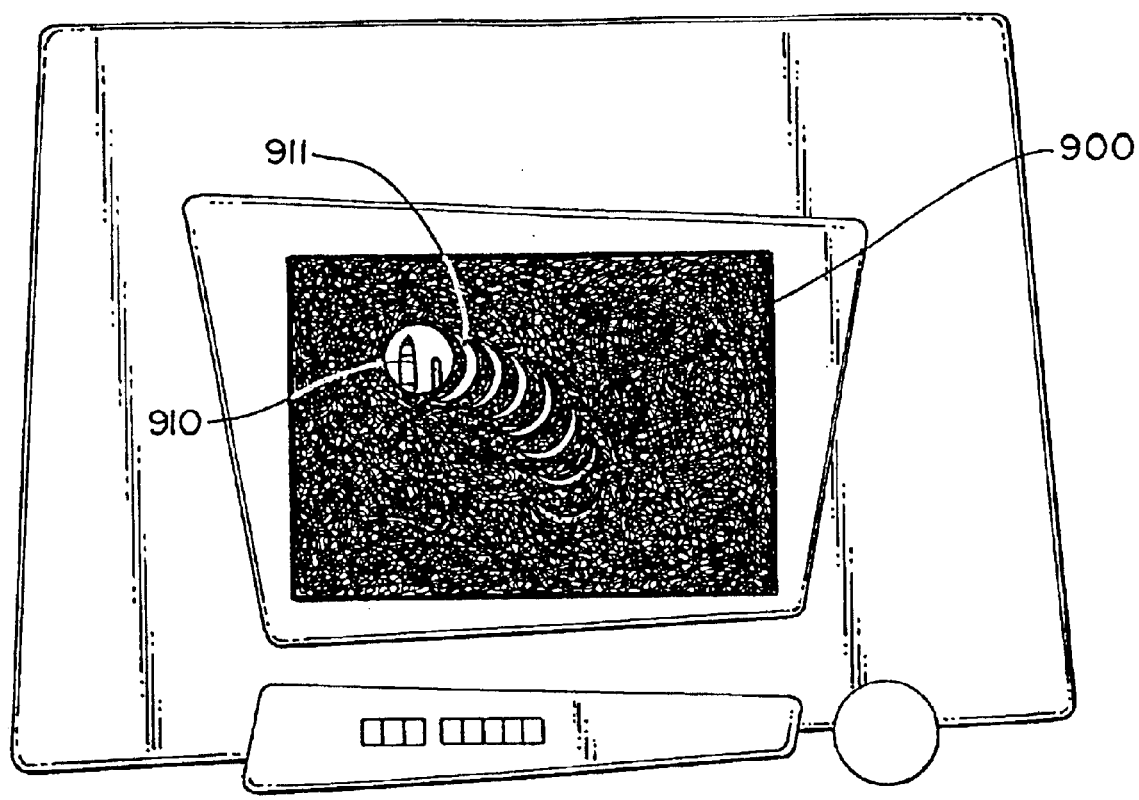
FIG. 9 illustrates a screen appearance for a contestant at an intermediate stage during an internet game show in which adjacent portions of the visual clue are progressively exposed while previously exposed portions of the visual clue are covered up in a sweeping spotlight motion according to the present invention.

FIG. 9 illustrates a screen appearance 900 for the contestants at an intermediate stage during an internet game show in which adjacent portions of the clue are progressively exposed while previously exposed portions of the clue are covered up in a sweeping spotlight motion according to the present invention. In the example shown in FIG. 9, a circular window 910 sweeps across the contestants' display windows, thereby exposing portions of visual clue. The movement of the circular window 910 is similar to the movement of the snake's head as discussed above with reference to FIGS. 6A, 6B, and 6C. Optionally, trailing crescent windows, such as crescent window 911 expose small portions where the circular window has recently been. The movement of the circular window 910 is preferably continuous in real time as observed by the contestants, although this is not required according to the present invention. In contrast to the previously discussed embodiments illustrated in FIGS. 3A through 8B, in the embodiment shown in FIG. 9, a predetermined fixed amount of the visual clue is exposed at any given time, rather than having a progressively greater portion of the visual clue exposed as real time progresses. This predetermined fixed amount is the sum of the areas of the circular window 910 and any crescent trailers, such as 911. Preferably, as illustrated in FIG. 9, the window 910 is circular; however, there is no requirement according to the present invention that the moving window exposing the visual clue is circular. For example, alternatively, the moving window is square, rectangular, triangular, hexagonal, or any other shape.

Figure 10A:
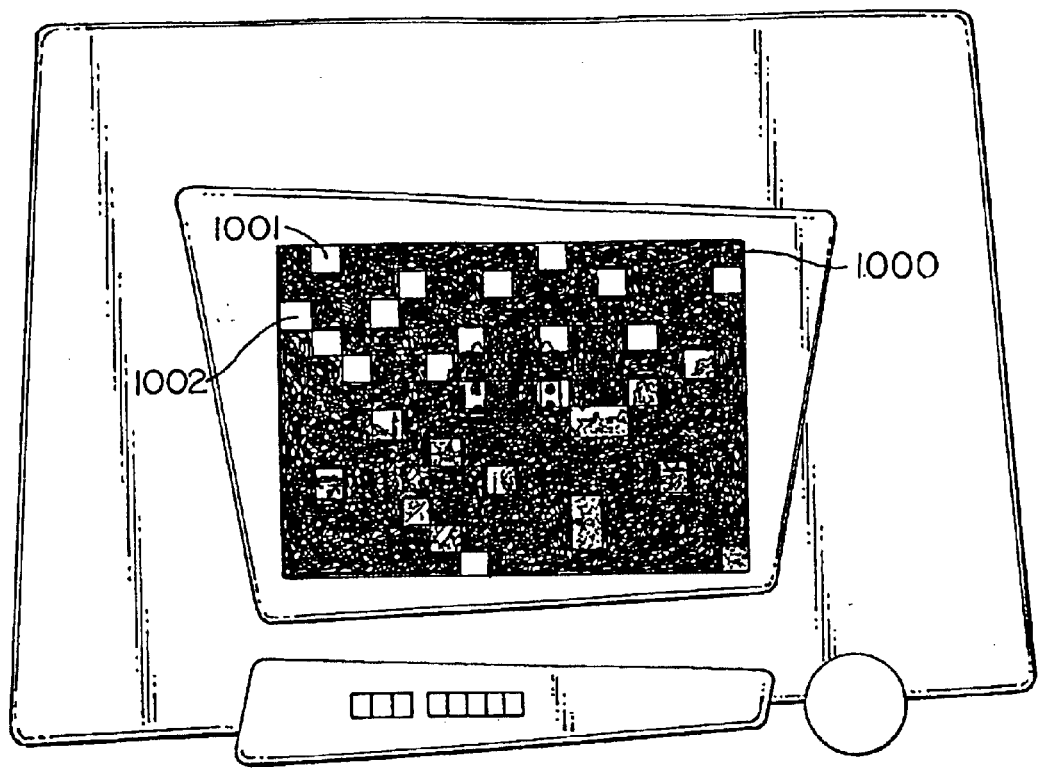
FIG. 10A illustrates a screen appearance for a contestant during an internet game show in which the visual clue is exposed in random, rapidly blinking shapes, such as squares, according to the present invention.

FIG. 10A illustrates a screen appearance 1000 for the contestants during an internet game show in which the visual clue is exposed in random, rapidly blinking shapes, such as squares, according to the present invention. For example, as shown in FIG. 10A, square portions 1001 and 1002 are exposed to all of the contestants at the intermediate time of the taking of the screen appearance 1000.

Figure 10B:
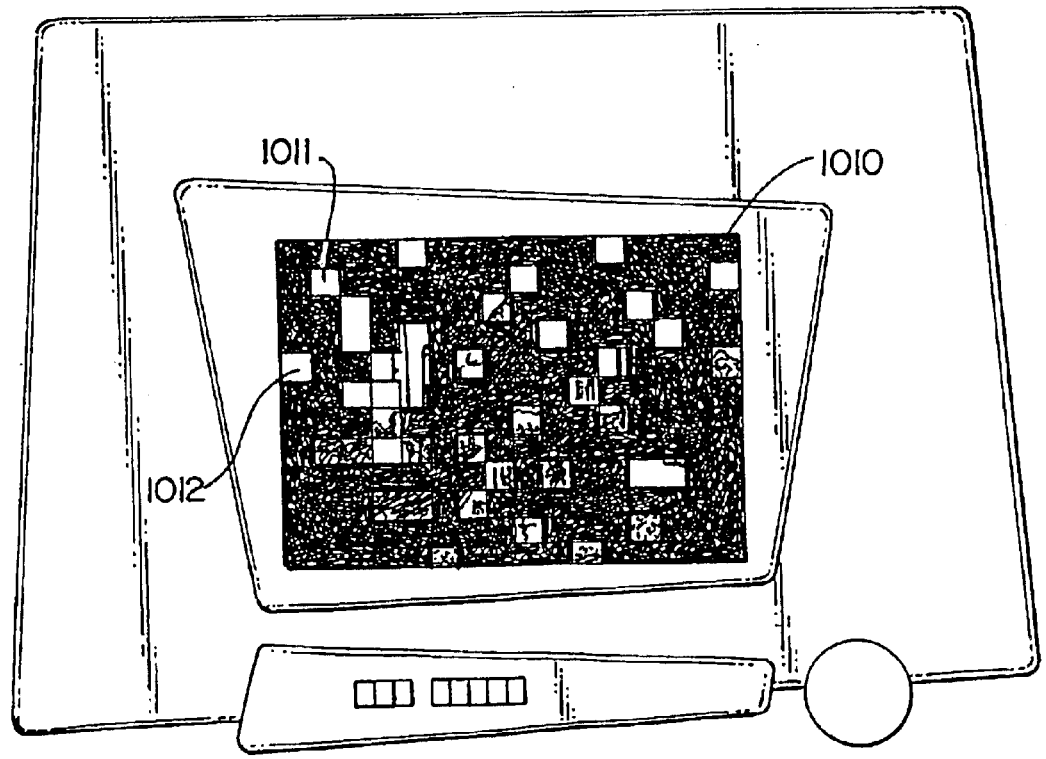
FIG. 10B illustrates another screen appearance for a contestant during an internet game show in which the visual clue is exposed in random, rapidly blinking shapes, such as squares, according to the present invention.

FIG. 10B illustrates another screen appearance 1010 for the contestants during an internet game show in which the visual clue is exposed in random, rapidly blinking shapes, such as squares, according to the present invention. The square portions 1001 and 1002 shown in FIG. 10A are no longer exposed, although the square portions 1011 and 1012 shown in FIG. 10B are exposed to all the contestants at the time of the taking of the snapshot shown in FIG. 10B. Thus, this embodiment is similar to the embodiment illustrated in FIG. 9 in the sense that previously exposed portions of the visual clue are covered up as new portions of the visual clue are exposed. Although the portions exposed in the example shown in FIGS. 10A and 10B are shown as square and as randomly chosen, there is no requirement according to the present invention that the exposed portions be square or randomly chosen. For example, the portions can be circular, oval shaped, triangular, rectangular, hexagonal, or any other shape, and can be blink in a predetermined pattern, rather than randomly, according to the present invention.

The above-described embodiments related to FIGS. 9 through 10B include covering up previously exposed portions of the visual clue. These embodiments are offered by way of example, not by way of limitation. The present invention includes exposing new portions and covering up previously exposed portions in real time as perceived by the contestants in any arbitrary fashion such that less than the entire visual clue is visible at any given real time during the internet game show. Preferably, the progressive exposing of new portions and covering up of previously exposed portions is performed such that only a predetermined fraction of the visual clue is exposed to the contestants at any given real time; however, there is no requirement according to the present invention that only a predetermined amount of the visual clue be exposed. All methods exposing any portion of the visual clue while covering up previously exposed portions are included in the present invention.

The embodiments of the present invention illustrated by FIGS. 3A through 10B thus far describe systems in which all participating contestants' computers, such as Player 1 102, Player 2 103, and Player 3 104 shown in FIG. 1, display the exact same portions of the visual clue to the contestants at the same real time. However, there is no limitation according to the present invention that the same portions of the visual clue are exposed to all contestants at the same real time during the internet game show. For example, the individual contestants may alternatively be given control over which portions of the visual clue are exposed at any given time, as described below with reference to FIGS. 11A and 11B.

Figure 11A:
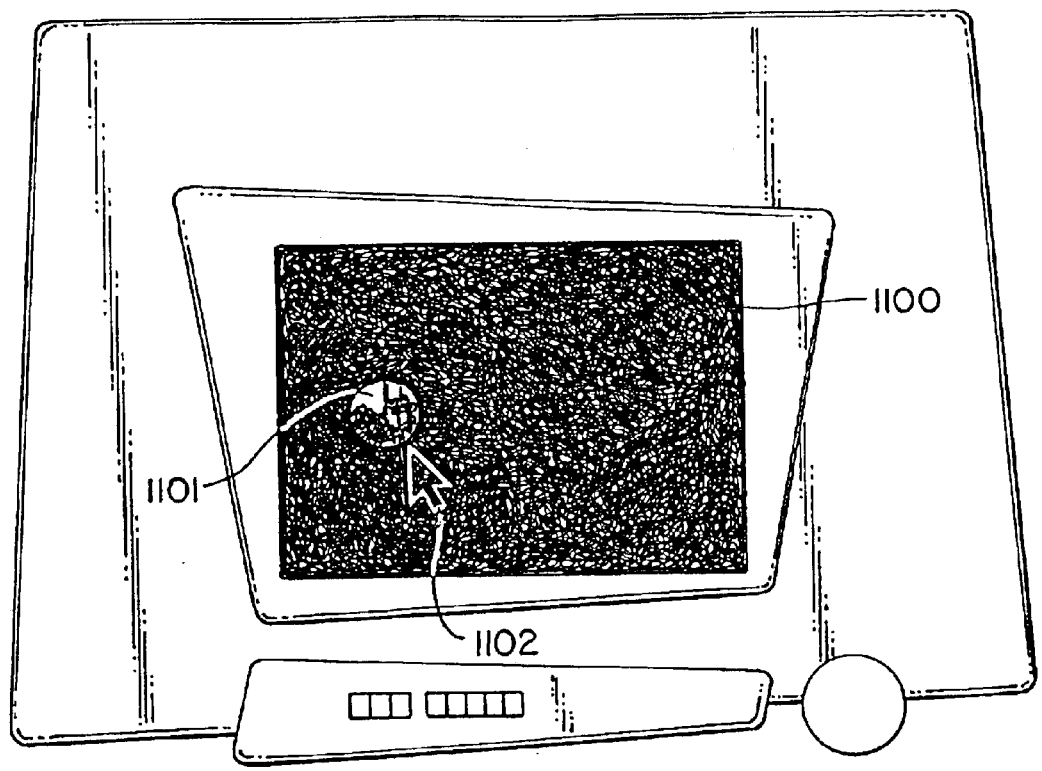
FIG. 11A illustrates a screen appearance for a contestant during an internet game show in which the visual clue is exposed in a window, for example having a circular shape, that is controlled by the contestant's cursor control device, such as a mouse, according to the present invention.

FIG. 11A illustrates a screen appearance 1100 for the contestants during an internet game show in which the visual clue 1100 is exposed in a window 1101, for example having a circular shape, that is controlled by the contestant's cursor control device 208, such as a mouse or touchpad, according to the present invention. As illustrated in FIG. 11A, the position of the window 1101 is controlled by the contestant's cursor 1102, which is controlled by the contest's cursor control device 208, which is controlled by the human contestant himself in real time during the internet game show.

Figure 11B:
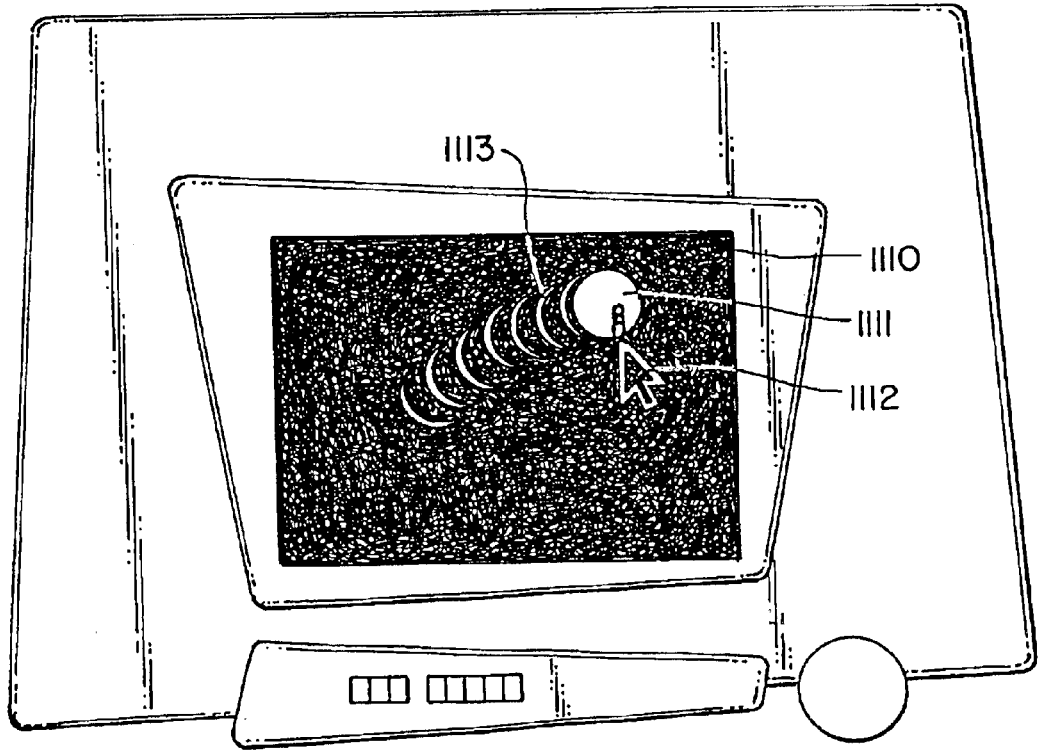
FIG. 11B illustrates another screen appearance for a contestant during an internet game show in which the visual clue is exposed in a window, for example having a circular shape, that is controlled by the contestant's cursor control device, such as a mouse, according to the present invention.

FIG. 11B illustrates another screen appearance 1110 for a contestant during an internet game show in which the clue is exposed in a window, for example having a circular shape, that is controlled by the contestant's cursor control device 208, such as a mouse or touch pad, according to the present invention. At the time of the taking of the snapshot 1110, the window 1111 has moved from its previous position 1101 shown in FIG. 11A. This movement was caused by the contestant's direction of the cursor 1112 to a new position on his display screen. The display window is optionally trailed by crescent windows, such as crescent 1113, which show where the display window had previously been. Preferably, the movement of the display window 1111 is continuous in real time as perceived by the human contestant watching his display 206; however, there is no requirement according to the present invention that this be the case. For example, the display window may move in discrete steps as perceived by the human contestant. As discussed above with reference to FIGS. 9, 10A, and 10B, in the embodiment illustrated in FIGS. 11A and 11B, only a predetermined amount of the visual clue is exposed at a given real time. There is no requirement according to the present invention that the contestant controlled display window have any particular shape. For example, the contestant controlled display window is alternatively rectangular.

FIGS. 11A and 11B describe embodiments in which the portions of the visual clue that are exposed are controlled by each individual contestant, and in which, as new portions of the visual clue are exposed to the contestant, previously exposed portions of the visual clue are covered up, such that only a fixed amount of the visual clue is exposed at any given real time to any given contestant. However, it is to be understood that this is only one example of allowing individual contestant input to control the portions that are exposed to that individual contestant. For example, the direction of movement of the head of the snake-like organic motion shown in FIGS. 6A through 6C can alternatively be controlled by the direction of the vector from the present position of the center of the snake's head to the current position of the cursor on the contestants' computer, where the position of the cursor is controlled by the human contestant himself. Thus, it is to be understood that the present invention includes all such embodiments in which individual contestant input on the individual contestant's computer determines which portions of the visual clue are exposed to the individual contestant.

Figure 12:
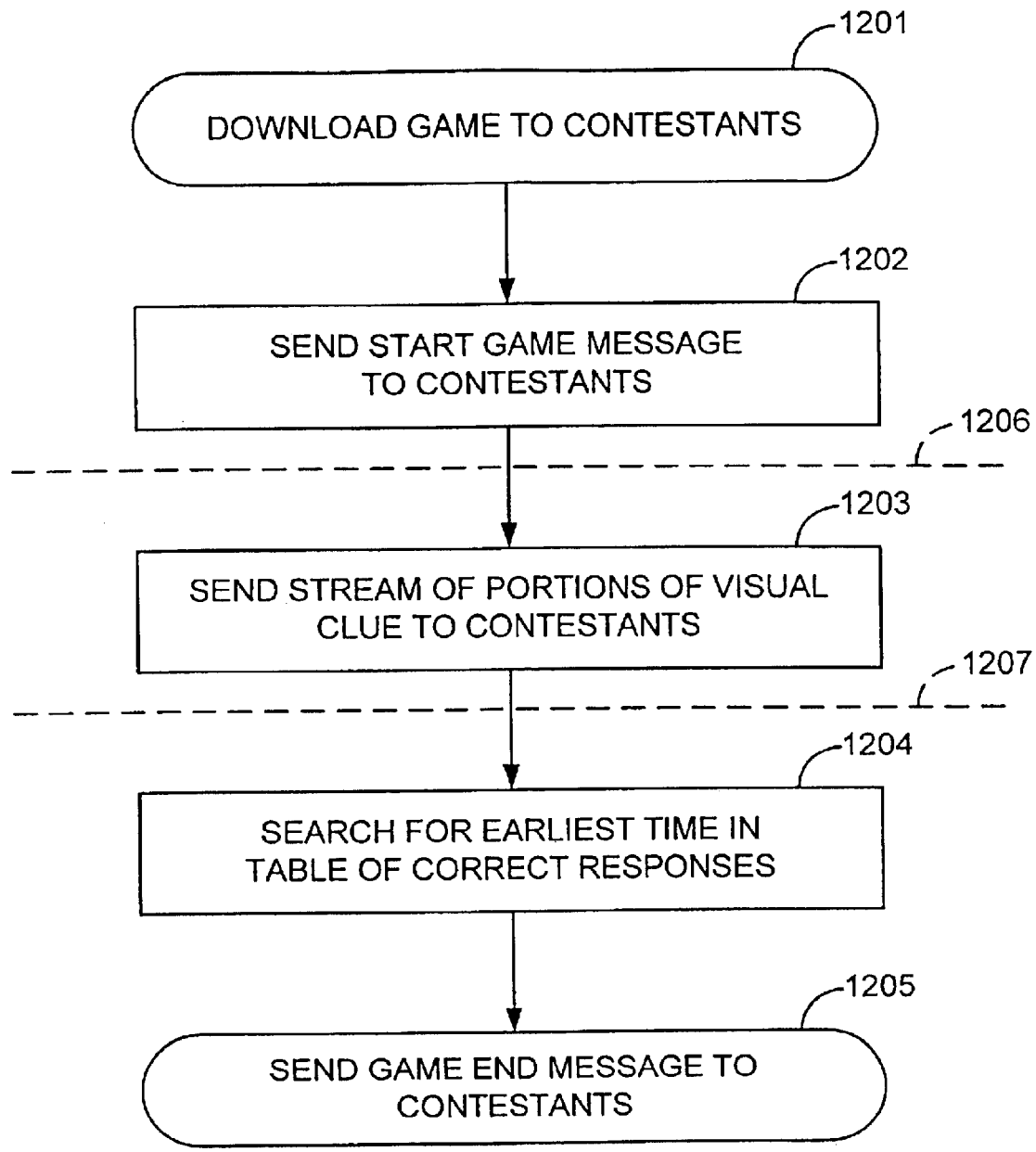
FIG. 12 illustrates a method performed by an internet game show host computer for administering an internet game show according to the present invention.

FIG. 12 illustrates a method 1200 performed by the game show host computer 101 for administering an internet game show according to the present invention among one or more contestants 102 through 104. At step 1201, the contestant's internet game show software is downloaded to all the contestant's computers 102 through 104. At step 1202, the game show host 101 sends a start game message to the contestants' computers 102 through 104 which sets to zero each of the contestant computer's timers for determining the time of dispatch of the contestants' responses. At step 1203, the game show host computer 101 sends a stream of portions of the visual clue to the contestants' computers 102 through 104. As further discussed below, this stream of portions of the visual clue to be progressively exposed can be sent and received in real-time during the play of the internet game show to implement the embodiments illustrated in FIGS. 3A through 10B or can alternatively be performed all at once prior to the beginning of the internet game show to implement the embodiments illustrated in FIGS. 3A through 11B. At step 1204 at the conclusion of the internet game show, the game show host computer 101 searches its table of correct responses for the correct response having the earliest dispatch time. Because the game show host cannot control the total real time delay in transit from the contestant's computer to the game show host's computer through the internet, the game show host waits for some predetermined time after the puzzle has been entirely revealed before comparing the send times of all the responses containing the correct answer. This predetermined wait time helps to ensure that all responses that contain the correct answer are in fact received by the game show host's computer before the winner is determined. The table of correct responses was constructed as a result of the responses sent by the various contestants 102 through 104 during the contestants' interactive portion of the game. At step 1205, the internet game show host computer 101 sends game end messages to the contestants' computers 102 through 104, indicating the name of the winning contestant and the correct answer. The contestants' interactive portion of the internet game show is defined by the dotted lines 1206 and 1207.

Figure 13:
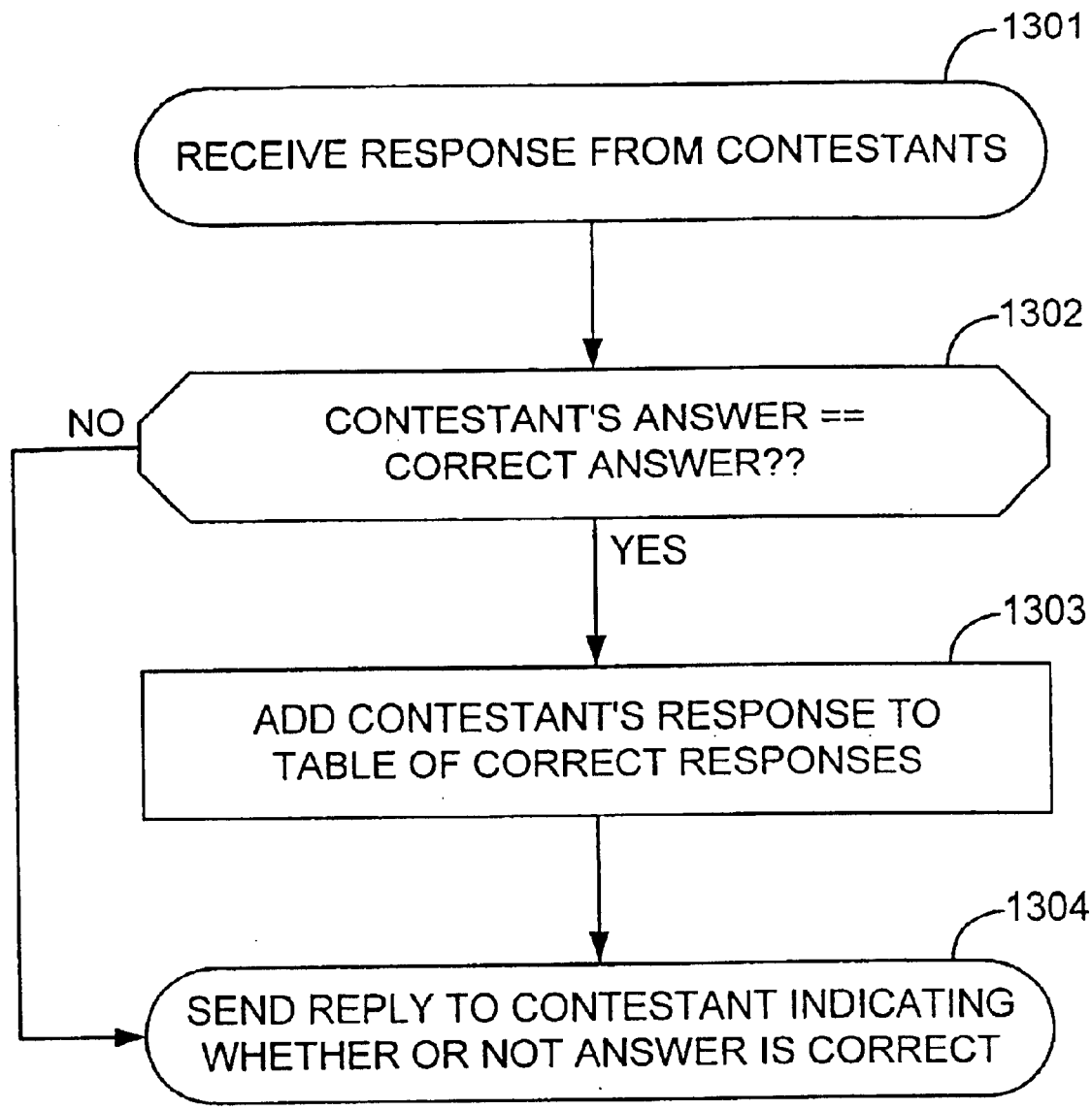
FIG. 13 illustrates a method performed by an internet game show host computer for processing responses sent by the various contestants during a contestant interactive portion of an internet game show according to the present invention.

FIG. 13 illustrates a method 1300 performed by the game show host computer 101 for administering the interactive portion of the game with the various contestants 102 through 104 during the internet game show according to the present invention. At step 1301, the game show host computer 101 receives a response from a contestant, for example, Player 2 103 that includes the contestant's answer. At step 1302, the contestant's answer is compared to the correct answer. If the contestants' answer is correct, then the contestant's response is added to the table of correct responses, which is maintained by the internet game show host computer 101 according to the present invention. At step 1304, the internet game show host computer 101 sends to the contestant's computer 103 a reply indicating whether or not the contestant's answer is correct. The method 1300 according to the present invention is performed by the internet game show host computer 101 each time a response is received by any contestant in the internet game show during the interactive portion of the internet game show. This method 1300 is performed in parallel with the distribution of the stream of portions of the visual clue performed at step 1203 of FIG. 12 during the internet game show.

There are a variety of ways that the internet game show host's distribution to the various contestants of the visual clue can be performed. In one alternative, a real-time stream of the individual portions are simultaneously sent to each of the various contestants' computers 102 through 104 such that the portions are exposed to the various contestants upon receipt. In this way, none of the contestant's computers contain the entire visual clue until the end of the internet game show. This alternative is desirable in the embodiments described with respect to FIGS. 3A through 10B, in which all contestants 102 through 104 are exposed to the same portions of the visual clue at the same real time.

However, in the embodiments described with reference to FIGS. 11A and 11B, in which each individual contestant determines the portions of the visual clue that are exposed at the various real time intervals during the play of the internet game show, the various contestants 102 through 104 are not exposed to the same portions of the visual clue at the same times. Therefore, in the embodiments in which contestant input determines how the visual clue is exposed, the visual clue is instead transmitted in its entirety to the various contestants before the beginning of the game. However, the contestants' internet game show software is written such that even though the entire visual clue is stored on the various contestants' computers 102 through 104, the internet game show software progressively exposes the visual clue through the contestants' displays 206 so that none of the contestants sees the entire visual clue until the end of the game. This alternative approach of sending the entire visual clue before the beginning of the game is also applicable to the embodiments shown in FIGS. 3A through 10B. In these alternatives in which the entire visual clue is included in the internet game software prior to the beginning of the game, steps 1201, 1202, and 1203 shown in Figure 1200 are essentially lumped into a single step, and the beginning of the contestant interactive portion of the internet game show indicated by the dotted line 1206 is delayed until after step 1203.

It is to be understood that although the game show host 101 has been illustrated and described as a single computer, such as general purpose computer architecture 200, there is no requirement that the various functions of the game show host be performed by a single computer. For example, in an internet game show including 50,000 contestants, the game show host may be implemented by several computers, such as one or more server computers performing the method 1200, including the issuing of the streams of portions of the visual clues to the various 50,000 contestants, while another one or more server computers performs the method 1300, including the receipt and replies to the various responses from the contestants.

Figures 14, 15:
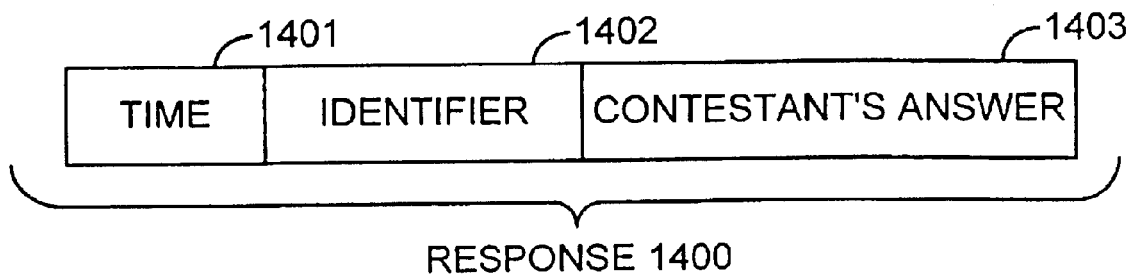
FIG. 14 illustrates the format of a response sent by a contestant's computer during a contestant interactive portion of an internet game show according to the present invention.
FIG. 15 illustrates an exemplary table of correct answers stored by the internet game show host during the internet game show and used by the internet game show host to determine the winner of the internet game show according to the present invention.

FIG. 14 illustrates the format of a response sent by a contestants' computer during a contestant interactive portion of an internet game show according to the present invention. Each contestant's response includes at least a time 1401 that the response was issued by the contestant relative to the beginning of the internet game show, a name or other unique identifier 1402 of the contestant, such as the contestants' internet protocol (IP) address, and the contestant's answer 1403, which is a series of characters.

FIG. 15 illustrates an exemplary table of correct answers 1500 stored by the internet game show host 101 during the internet game show and used by the internet game show host 101 to determine the winner of the internet game show according to the present invention. As discussed above with respect to step 1303 of FIG. 13, only correct contestant responses are added to the table of correct answers 1500, thus the internet game show host's table of correct answers 1500 need only include the time 1501 and identifier 1502 fields. In the example show in FIG. 15, Player_9 issued a correct response to the game show host 20.08 seconds after the beginning of the internet game show. Player_1 issued a correct response 19.66 seconds after the beginning of the internet game show. Player_6 issued a correct response 17.76 seconds after the beginning of the internet game show. Player_4 issued a correct response 18.69 seconds after the beginning of the internet game show. Player_7 issued a correct response 22.36 seconds after the beginning of the internet game show. Player_2 issued a correct response 31.00 seconds after the beginning of the internet game show. In all likelihood, many incorrect responses may have been received by the internet game show host 101, however these responses need not be stored by the internet game show host. In the example illustrated in FIG. 15, Player_6 will be determined by the internet game show host 101 to be the winner at step 1204 at the conclusion of the internet game show, because Player_6's correct response was dispatched from his computer at the earliest time relative to the beginning of the internet time show. The relevant time 1401 of the response is measured from the beginning of the internet game show because the clocks on the individual contestants' computers are not synchronized. The relevant time 1401 of the response the time of dispatch from the contestant rather than the time of receipt by the internet game show host because the transit time through the internet of the response from the contestant's computer to the internet game show host computer is highly variable from contestant to contestant and from response to response.

Figure 16:
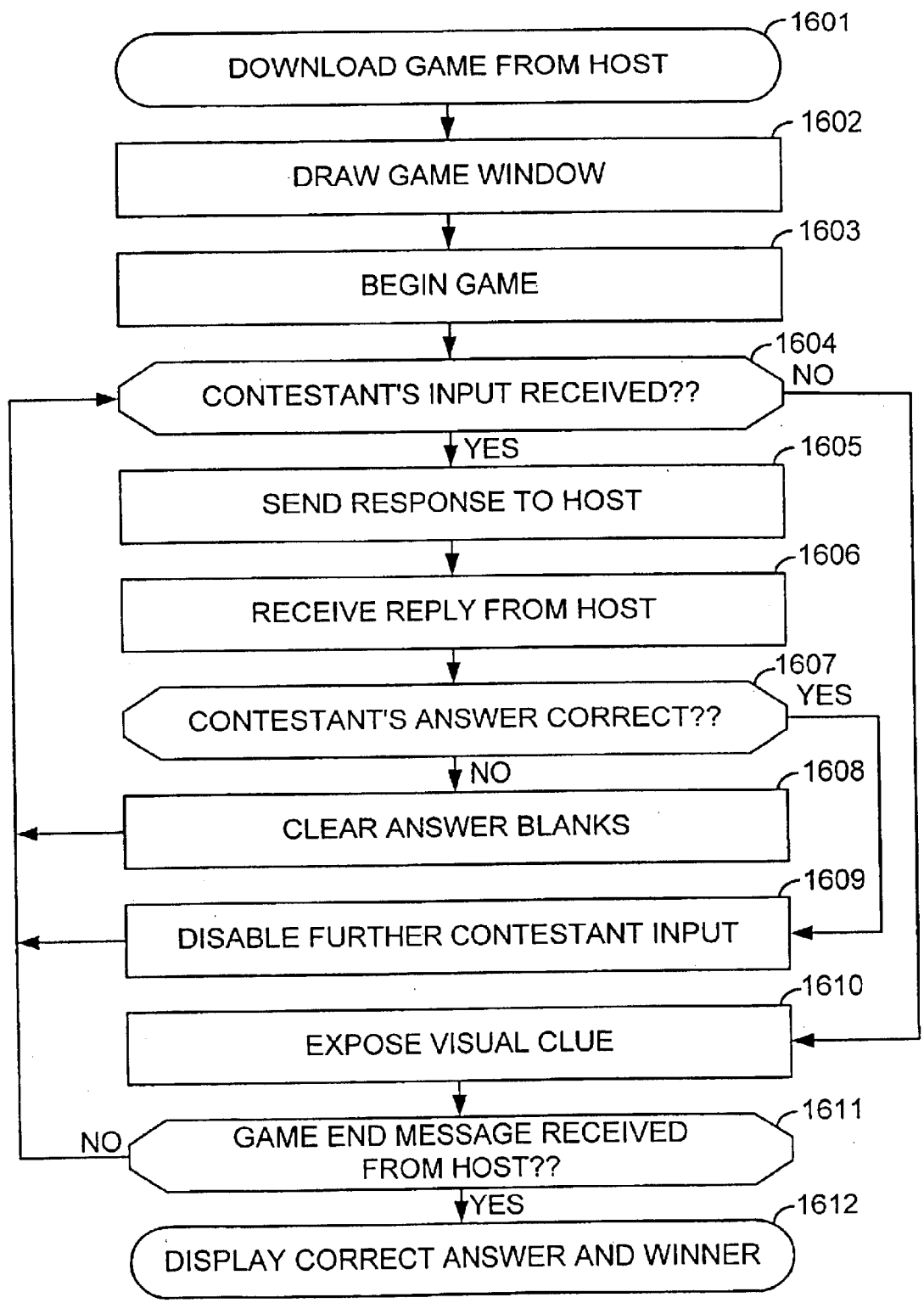
FIG. 16 illustrates a method performed by a contestant's computer for competing in an internet game show according to the present invention.

FIG. 16 illustrates a method 1600 performed by a contestant's computer, such as Player 2 103 in FIG. 1, for competing in an internet game show according to the present invention. At step 1601, the contestant's computer 103 downloads the contestant's internet game show software from the internet game show host computer 101. At step 1602, the game window, such as shown in FIG. 3A, is drawn on the contestant's computer display 206. At step 1603, the internet game show begins after the receipt by the contestant's computer 103 of a start game message issued by the internet game show host 101 at step 1202 in FIG. 12.

Test 1604 determines whether or not contestant input has been received or not from the human contestant to the contestant's computer 103 through the keyboard 207 and/or cursor controller 208. Contestant input refers to the entering of a contestant's answer in the series of blanks 302 shown in FIG. 3A and activating the send button 304 shown in FIG. 3A either by the cursor controller 208 or a hot key on the keyboard 207. If contestant input is received, the contestant's computer 103 sends a contestant's response to the internet game show host computer 101 over the internet 105 at step 1605. The contestant's computer 103 then receives the internet game show host's reply to the contestant's response at step 1606 from the internet game show host 101 over the internet 105. At test 1607, the contestant's computer 103 examines the internet game show host's reply to determine whether or not the contestant's response included the correct answer. If the internet game show host's reply indicates that the contestant's answer was not the correct answer, then the contestant's computer 103 clears the answer blanks 302 at step 1608 in the contestant's game window 300, and the method returns to test 1604 to check for further contestant input, since the contestant is preferably allowed to submit as many responses as he desires until he submits a response containing the correct answer. If test 1607 determines that the contestant's answer was indeed correct, then at step 1609 the contestant's computer 103 disables further contestant input by freezing the correct answer into the series of blanks 302, so that the contestant can no longer alter the contents of the series of blanks 302 or activate the send button 304.

As discussed above with respect to FIGS. 3A through 11B, portions of the visual clue are progressively exposed to the contestants at step 1610. Test 1611 determines if a game end message has been received by the internet game show host. If the game end message containing the correct answer and the winner has not been received by the contestant's computer 103, then the internet game show until test 1611 determines that the game end message has been received, at which time the contestant's computer at step 1612 displays the correct answer and the winner.

While the present invention has been described with reference to its preferred and alternative embodiments, those embodiments are offered by way of example, not by way of limitation. Various additions, deletions, and modifications can be made to the embodiments of the present invention by those skilled in the art without departing from the spirit and scope of the present invention. Accordingly, all such additions, deletions, and modifications are deemed to lie within the spirit and scope of the present invention as delineated in the appended claims.

What is claimed is:

1. A method for hosting an internet game show, the method comprising the steps of:

associating a visual clue with a correct textual answer; and distributing to a plurality of players a series of portions of the visual clue at predetermined time intervals over the internet, wherein each of the plurality of players exposes a different series of portions of the visual clue, wherein each series of portions of the visual clue is shown only to the player exposing the series of portions of the visual clue.

2. A method as in claim 1, further comprising the step of:

receiving a winning response from one of the plurality of players including the correct textual answer.

3. A method as in claim 2, further comprising the step of:

receiving one or more non-winning responses from the one or more of the plurality of players; wherein the one or more non-winning responses include incorrect textual answers.

4. A method as in claim 2, further comprising the step of:

receiving one or more non-winning responses from the one or more of the plurality of players; wherein the one or more non-winning responses include the correct textual answer that was sent by one or the plurality of players at a time prior to the time subsequent to the receipt of the winning response.

5. A method as in claim 1, wherein the portions of the visual clue comprise square portions of the visual clue.

6. A method as in claim 1, wherein the portions of the visual clue comprise vertical strips of the visual clue.

7. A method as in claim 1, wherein the portions of the visual clue comprise horizontal strips of the visual clue.

8. A method for allowing a plurality of contestants to participate in an internet game show, the method comprising the steps of:

for each contestant, receiving over the internet a visual clue from an internet game show host; and for each contestant, progressively exposing to each of the contestants portions of the visual clue, wherein each of the plurality of contestants concurrently selects and exposes a different series of portions of the visual clue, and wherein each series of portions of the visual clue is shown only to the contestant selecting the series of portions of the visual clue.

9. A method as in claim 8, further comprising the step of:

receiving contestant input from the contestant specifying a textual answer.

10. A method as in claim 9, further comprising the step of:

transmitting over the internet the textual answer to the internet game show host.

11. A method as in claim 8, wherein the step of progressively exposing to the contestant portions of the visual clue comprises exposing to the contestant portions of the visual clue at predetermined time intervals.

12. A method as in claim 11, wherein the portions of the visual clue comprise square portions of the visual clue.

13. A method as in claim 11, wherein the portions of the visual clue comprise vertical strips of the visual clue.

14. A method as in claim 11, wherein the portions of the visual clue comprise horizontal strips of the visual clue.

15. A method as in claim 8, wherein the step of progressively exposing to the contestant portions of the visual clue comprises continuously exposing to the contestant portions of the visual clue.

16. A method as in claim 15, wherein the portions of the visual clue comprise square portions of the visual clue that continuously increase in size.

17. A method as in claim 15, wherein the portions of the visual clue comprise circular portions of the visual clue that continuously increase in radius.

18. A method as in claim 15, wherein the portions of the visual clue comprise contiguous portions of a strip that is continuously exposed in a snake-like organic motion.

19. A method as in claim 8, wherein the step of progressively exposing to the contestant portions of the visual clue comprises exposing only a predetermined amount of the visual clue to the contestant at any given time, such that, as new portions of the visual clue are exposed, previously exposed portions of the visual clue are no longer exposed.

20. A method as in claim 19, wherein the portions of the visual clue are determined by a sweeping spotlight type of motion.

21. A method as in claim 19, wherein the portions of the visual clue are determined in the form of random, rapidly blinking shapes in space.

22. A method as in claim 19, wherein the portions of the visual clue are determined by contestant input.

23. A method for hosting an internet game show, the method comprising the steps of:

associating a visual clue with a correct textual answer; and distributing to a plurality of players a series of portions of the visual clue at predetermined time intervals, wherein each of the plurality of players exposes a different series of portions of the visual clue, wherein each series of portions of the visual clue is shown only to the player exposing the series of portions of the visual clue.

24. A method as in claim 23, wherein the distributing step is performed over a television channel.

\* \* \* \* \*